United States Patent

Nagahashi et al.

[11] Patent Number: 5,847,310
[45] Date of Patent: Dec. 8, 1998

[54] SQUIB FOR AN AIR BAG WITH AN AUTO IGNITION COMPOSITION

[75] Inventors: Ken-ichi Nagahashi; Yuji Ito; Ayumu Kimura; Masaharu Murakami; Eishi Sato; Michihisa Taguchi, all of Himeji, Japan

[73] Assignee: Nippon Kayaku Kabushiki-Kaisha, Tokyo, Japan

[21] Appl. No.: 878,802

[22] Filed: Jun. 19, 1997

Related U.S. Application Data

[63] Continuation-in-part of Ser. No. 365,105, Dec. 28, 1994, Pat. No. 5,756,928.

[30] Foreign Application Priority Data

Dec. 28, 1993 [JP] Japan .................................. 5-353718
Jul. 7, 1994 [JP] Japan .................................. 6-180570

[51] Int. Cl.[6] .................................................. F42B 3/18
[52] U.S. Cl. ................................. 102/202.6; 102/202.5; 102/202.7; 102/205
[58] Field of Search .................................. 102/202, 205, 102/202.5, 202.7, 202.6

[56] References Cited

U.S. PATENT DOCUMENTS

| 3,773,351 | 11/1973 | Catanzarite | 102/39 |
| 4,907,509 | 3/1990 | Lieberman | 102/202.5 |
| 5,046,429 | 9/1991 | Swann et al. | 102/530 |
| 5,253,584 | 10/1993 | Allford | 102/202.7 |
| 5,285,727 | 2/1994 | Reams et al. | 102/202.5 |
| 5,431,103 | 7/1995 | Hock et al. | 102/290 |
| 5,460,671 | 10/1995 | Khandhadia | 102/205 |
| 5,494,312 | 2/1996 | Rink | 280/741 |
| 5,639,986 | 6/1997 | Evans | 102/202.7 |
| 5,756,928 | 5/1998 | Kimura et al. | 149/7 |

*Primary Examiner*—Edward A. Miller
*Attorney, Agent, or Firm*—Oblon, Spivak, McClelland, Maier & Neustadt, P.C.

[57] ABSTRACT

A squib for a gas generator, comprising a magazine which is formed with a squib cup and a squib plug and is sealed; a pair of electrode lead pins penetrating through said squib plug to said magazine; a bearing wire connected to ends of said electrode lead pins; and an explosive contained in said magazine, said explosive composition containing a spontaneous firing explosive composition comprising carbohydrates, oxohalogenates and metal oxides.

17 Claims, 16 Drawing Sheets

Bunsen burner viewing from X viewing from Y

SQUIB FOR AN AIR BAG WITH AN AUTO IGNITION COMPOSITION

This application is a continuation-in-part and claims priority of U.S. application Ser. No. 08/365,105, filed Dec. 28, 1994, now U.S. Pat. No. 5,756,928. The disclosure of this application is incorporated herein by reference.

BACKGROUND OF THE INVENTION

1. Field of the Invention

The present invention relates to a gas generator for an air bag having a spontaneously-firing composition which fires at a predetermined temperature to prevent breakdown of a casing when the gas generator for the air bag is heated. The present invention also relates to a squib suitable for a gas generator having a spontaneously-firing function.

2. Discussion of the Background

A passive safety device for a vehicle is known which inflates an air bag with a gas generated by a gas generator to ensure the safety of occupants therein when the vehicle is involved in a collision. The gas generator contains a gas generant, an igniting agent for igniting the gas generant and a squib for initiating the igniting agent, which are contained in a casing. It is not always necessary to use both the squib and the igniting agent, and either one may be used as needed. In such cases, each serves the same function. The casing is typically made of a light alloy material, such as an aluminum alloy, in order to ensure a reduced weight.

Light alloy materials exhibit reduced mechanical strength when heated to a high temperature. Hence, a gas generator using such a material for the casing is acceptable in normal cases where the igniting agent is initiated by the squib upon collision and the gas generant is subsequently ignited to generate gas. However, when heat is externally applied to a vehicle or in a warehouse, and where the spontaneous firing temperature of the igniting agent or the gas generant is higher than the temperature at which the mechanical strength of the casing has deteriorated, firing can occur after the mechanical strength of the casing deteriorates. As a result, the casing is broken due to the pressure caused within the gas generator with a risk of being scattered in small pieces.

In attempting to address this problem, U.S. Pat. No. 4,561,675 discloses a technique relating to an auto ignition device. This auto ignition device has a primary firing agent that fires spontaneously at a temperature of approximately 177° C., at which the temperature mechanical strength of the metal container is not deteriorated. The metal container is a single independent member made of a metal foil and fixed to an inside of a gas generator casing with a heat resistant adhesive or a cushion. The firing direction of the primary firing agent is directed to a igniting agent or a gas generant that the fire at a temperature of approximately 343° C.

In addition, Japanese Patent Laid Open No. 2-74441 discloses a technique relating to an auto ignition device. The auto ignition device has a primary firing agent that will fire spontaneously at a temperature of about 160° C. to 180° C. The primary firing agent casing is inserted in an opening portion of a casing for a gas generator through an insulating material.

Further, Japanese Patent Laid Open No. 5-229397 discloses a technique relating to another auto ignition device. This auto ignition device applies a spontaneous firing agent to an explosive within a squib. The spontaneous firing agent contains sulfur-containing binder/sodium perchlorate as a major component that fires spontaneously in 3 minutes at 150°–300° C.

Conventional gas generants utilize agents based on sodium azide. These agents have an adequate burning rate and a long-term stability when being subjected to high- or low-temperature environments. The spontaneous firing temperature thereof is as high as 400° C. or higher. The mechanical strength of the alloy materials, such as aluminum alloys, is significantly reduced at that temperature, so that the casing will be broken.

The igniting agent is conventionally sealed in an igniting agent container. As igniting agents apply mixtures of boron and potassium nitrate are used, which mixtures fire spontaneously at about 500° C. Unfortunately, the mechanical strength of the light alloy material is significantly reduced at that temperature.

A conventional squib has a structure in which an explosive is filled within a squib cup of a cylindrical shape with a bottom, which cup is sealed with a squib plug having a bridge wire for heating which is connected to the exterior through a couple of lead pins and the explosive contacts with the bridge wire. The explosive within the squib commonly contains mixtures of perchlorate and an organic material or metal powder, considering the dual requirements of good initiatability and stability. When heated suddenly from outside, lead trinitroresorcinate/potassium perchlorate, for example, will fire spontaneously at about 270° C. while zirconium/potassium perchlorate will fire spontaneously at about 350° C. As other explosives which can be used in the squib, U.S. Pat. No. 3,773,351 discloses those containing sucrose and potassium chlorate.

In the gas generators disclosed in U.S. Pat. No. 4,561,675 and Japanese Patent Laid Open No. 2-74441, however, there is the disadvantage that it is necessary to form a containing portion specifically for the auto ignition device in the gas generator. In the gas generator disclosed in Japanese Patent Laid Open No. 5229397, the spontaneous firing material also serving as the igniting agent is applied to the explosive for the ignitor. The bridge wire contacting therewith is corroded by acidic substances generated as a result of deterioration over time. Hence, there is a risk of aberrant operation with the ignitor not initiating as in normal operation. The squib disclosed in U.S. Pat. No. 3,773,351 uses an explosive containing sucrose and potassium chlorate, so that, ideally, a spontaneous firing capability of about 180° C. should be observed. However, the thermal stability is poor. In particular, this explosive does not pass the heat aging test at about 100° C., such as 107° C.×400 hours, so that it cannot be used in practice. In addition, spontaneous firing materials conventionally used also lack high-temperature stability. Further, those serving also as the igniting agents have the disadvantage of lacking the necessary burning rate.

In particular, devices having the squib containing the spontaneous firing material have a structure such that the squib is contained within the gas generator, which makes heat less likely to be transferred. As a result, there is the disadvantage that firing will not occur spontaneously at a predetermined temperature range in response to application of external heat. This problem may occur whenever the spontaneous firing material is contained in the gas generant or in the igniting agents.

Accordingly, a need exists for a safe and positive gas generator for an air bag which fires spontaneously in a predetermined temperature range in response to application of external heat even when the gas generator used in deploying an air bag as a passive safety device contains a spontaneous firing material in at least one of a squib, an igniting agent or a gas generant. A need further exists for such a air bag gas generator which continues to exhibit stable properties when exposed to and being subjected to high-temperature environments for a long period of time.

SUMMARY OF THE INVENTION

Accordingly, it is an object of the present invention to provide a safe and positive gas generator for an air bag.

It is also an object of the present invention to provide a spontaneous explosive composition for the present gas generator.

The above objects and others are provided, in more detail, by a gas generator for an air bag, containing a squib or one or more igniting agents and a gas generant contained therein wherein at least one of the squib, the igniting agents or the gas generant contains a spontaneously-firing explosive compositon containing carbohydrates, oxohalogenates or metal oxides or a mixture thereof.

BRIEF DESCRIPTION OF THE DRAWINGS

FIGS. 14 and 15 are views of FIG. 13 from points X and Y, respectively.

DETAILED DESCRIPTION OF THE PREFERRED EMBODIMENT

Figure 1:
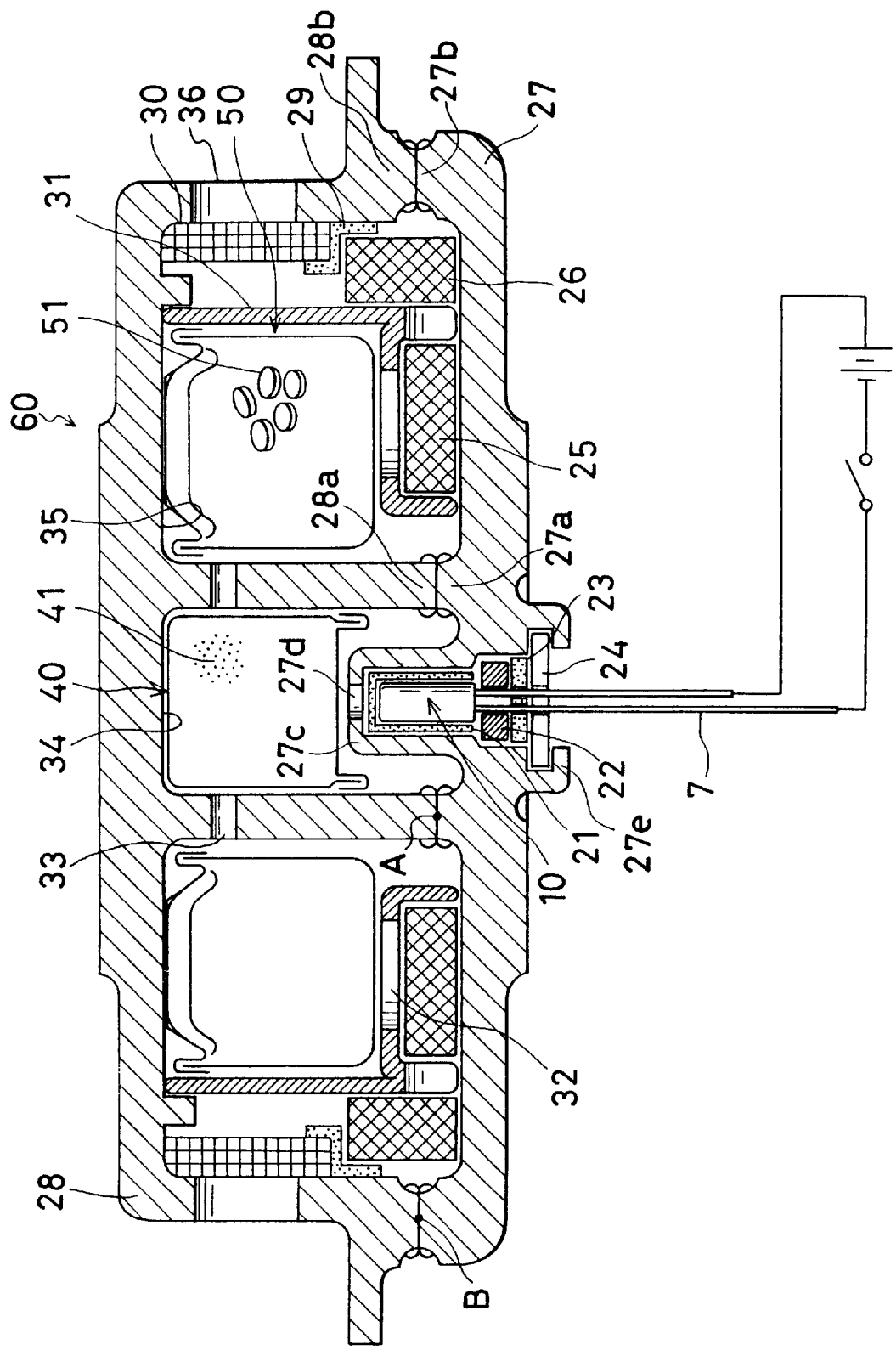
FIG. 1 is a sectional view of a gas generator for an air bag according to the present invention.

In accordance with the present invention, a gas generator for an air bag is provided which achieves the above-mentioned object and which contains a spontaneously-firing explosive composition, wherein at least one of a squib, an igniting agent or a gas generant is contained in a casing formed of a light alloy material. The spontaneous firing explosive composition generally contains carbohydrates, oxohalogenates and metal oxides and spontaneously fires in a temperature range of about 165°–220° C. In environments where heat is less likely to be transferred from the surroundings, a synthetic resins is further added. In that case, the spontaneous firing explosive composition contains of carbohydrates, oxohalogenates, metal oxides and one or more synthetic resins. This composition may spontaneously fire in the lower temperature range of 165°–200° C. In addition, the above-mentioned explosive composition, which is contained in one of the squib, the igniting agent or the gas generant will fire spontaneously in the above-mentioned temperature range before the mechanical strength of the casing is deteriorated due to external heating.

The carbohydrates of the present spontaneously-firing explosive composition function as a gasifying component, the oxohalogenates function as an oxygen-supplying component, the metal oxides function as a heat-aging agent (thermal stabilizer), and the synthetic resins function as a component which improves the heat conductivity between the explosive composition particles. Accordingly, a spontaneous firing temperature of 165°–220° C. or a lower spontaneous firing temperature of 165°–200° C. may be selected, as needed, by selecting the appropriate composition.

Since a gas generator for an air bag mounted on a vehicle may be exposed to a high-temperature for a long perior of time, such as in an outdoor parking facility in summer or in a tropical area, high-temperature stability is most important. The metal oxides of the present invention greatly contribute to this thermal stability. In particular, the thermal stability is improved by means of coating the carbohydrate or/and oxohalogenate particles to avoid direct contact therebetween. In addition, the synthetic resins have the effect of decreasing the spontaneous firing temperature by means of contacting densely the above-mentioned explosive composition particles with each other so as to improve the heat conductivity therebetween.

To achieve a desired spontaneous firing temperature of 165°–220° C. or 165°–200° C., as well as an adequate burning rate, the carbohydrates of the present invention are preferably used in an amount of about 95.0–1.0% by weight, the oxohalogenates are preferably used in an amount of about 95.0–1.0% by weight and the metal oxides are preferably used in an amount of about 30.0–0.01% by weight. Synthetic resins, if added thereto, are preferably used in an amount of about 0.05 to 20.0% by weight. This composition ratio may be varied within the above-mentioned general composition range depending on the burning rate suitable for a desired part of the gas generator, based on the stoichiometric ratio required for burning carbohydrates and oxohalogenates. In particular, the metal oxides are preferably present in an amount of about 30.0–0.01% by weight and more preferably 10.0–1.0% by weight. This may be varied advantageously to adjust the burning rate depending on an internal structure of the gas generator used. If carbohydrates are used in amounts which are out of this range, the burning rate obtained will be unacceptable. With amounts of oxohalogenates which are out of this range, the spontaneous firing function obtained will be deteriorated. With amounts of metal oxides which are out of this range, the heat aging property and the spontaneous firing function obtained will be deteriorated. If amounts of synthetic resins which adjust the heat conductivity between the explosive composition particles are out of this range, the spontaneous firing temperature will change significantly depending on a degree of mixing.

It has also been discovered, in accordance with the present invention that the particle diameter of the carbohydrates, oxohalogenates and metal oxides significantly affects the positive firing and the high-temperature stability. Preferably, an average particle diameter of carbohydrates of about 0.5 mm to 0.0001 mm is used. An average particle diameter of oxohalogenates is preferably about 1.0 mm to 0.0001 mm, while a particle diameter of metal oxides of about 0.5 mm or smaller is preferably used. With carbohydrates having a particle diameter which is out of this range, the heat-aging property will be deteriorated. With oxohalogenates having a particle diameter which is out of this range, the burning rate will be unacceptable. With metal oxides having a particle diameter which is out of this range, the heat-aging property and the spontaneous firing function will be deteriorated.

In particular, the particle diameter of the metal oxides is preferably about 1/10 or smaller than the particle diameter of the carbohydrates.

It is possible to ensure positive firing and the high-temperature stability when the average particle diameter of metal oxides is 1/10 or smaller than the average particle diameter of at least one of the carbohydrates and oxohalogenates and when at least one of the carbohydrates and oxohalogenates is coated with metal oxides.

One method of coating which may be used is as follows: First, carbohydrates are mixed with metal oxides to coat the metal oxides on the surface of the carbohydrates. In another vessel, oxohalogenates are mixed with metal oxides to coat the metal oxides on the surface of the oxohalogenates. Subsequently, each is mixed then with the other. This mixing improves high-temperature stability. The burning rate can also be adjusted by the amount of coating used.

When the average particle diameters of the individual components are all 0.05 mm or smaller, these three components may be mixed simultaneously.

The carbohydrates used may be any one or a mixture of sucrose, lactose, glucose, powder cellulose, dextrin and wood powder. It is preferable to use sucrose as the carbohydrate having the preferable spontaneous firing temperature of either 165°–200° or 165°–220°.

The oxohalogenates used may be chlorates and perchlorates, such as potassium chlorate, potassium perchlorate, sodium chlorate, sodium perchlorate, barium chlorate and barium perchlorate; bromates and perbromates such as potassium bromate, potassium perbromate, sodium bromate and sodium perbromate; and iodates and periodates such as potassium iodate, potassium periodate, sodium iodate and sodium periodate. Chlorates and perchlorates are particularly preferable in view of easy handling. Potassium chlorate and potassium perchlorate are most preferable. However, any one of these oxohalogenate or mixtures thereof may be used.

The metal oxides used may be magnesium oxide, calcium oxide, zinc oxide, potassium oxide, sodium oxide and cesium oxide. Magnesium oxide, calcium oxide and zinc oxide are preferable in view of easy handling. In addition, light magnesium oxide is particularly preferable in view of its fine and uniform particle diameter. However, any one of these metal oxides or mixtures therof may be used.

The synthetic resins used may be silicon resins, urethane resins, polyesters, acrylic resins and butyl rubbers. A one-component room temperature vulcanizing silicone resin is particularly preferable in view of easy handling and thermal stability. It is noted that granulation is made by means of mixing carbohydrates, oxohalogenates and metal oxides with each other, to which the synthetic resins is added. Any one or mixture of such resins may be used.

When the spontaneously firing explosive composition having the above mentioned components is contained in the gas generant, it may be in the form of tables or formed into pellets by using an adequate binder to adjust the burning rate, if necessary. In addition, it may be possible to add inorganic powders such as talc, alumina oxide and silicon dioxide as well as organic powders such as wood powder, synthetic resins powder and rosin powder to adjust the burning rate.

In containing the spontaneously firing explosive composition having the above-mentioned components in the squib, the composition may contact the bridge wire directly. However, where an extremely short firing time is preferable, it is preferable to form a layer structure where an initiating agent contacts with the bridge wire, and the spontaneously firing explosive composition having the above-mentioned components contacts with the initiating agent. Such a squib is a single product applicable generally to a part where a spontaneously firing function is required.

As such an initiating agent, metal powder/$KClO_4$, diazo-dinitrophenol (ODNP), tetracene/lead trinitroresorcinate, lead trinitroresorcinate/$KClO^4$ and lead styphnate/$KClO_3$ may be used. Metal powder/$KClO_4$ is preferable in view of thermal stability and good initiatability.

The metal powder may be any one of or a combination of zirconium, tungsten, titanium, aluminum, magnesium, iron, nickel and copper. In view of good initiatability, zirconium or a mixture of zirconium and tungsten is preferable.

In a gas generator for an air bag where such a squib is held within a casing formed of a light metal material, such as an aluminum alloy, the gas generator for the air bag contains the squib having a layer structure of an initiating agent contacted with the bridge wire and an spontaneous firing explosive composition contacted with the initiating agent, the spontaneous firing explosive composition containing carbohydrates, oxohalogenates, metal oxides and ne or more synthetic resins, and a portion of the squib corresponding to the spontaneous firing explosive composition being exposed within said casing in a poor contact condition with said casing. More specifically, the essentials of the squib formed of the above-mentioned spontaneous firing explosive composition containing the synthetic resins need not be well-coated with the casing so as to improve the heat conductivity between the casing. Accordingly, the attachment structure for the squib to the casing can be greatly simplified.

In addition, the casing of gas generator is made of a light metal material, such as aluminum alloy, which is formed with an upper casing member and a lower casing member having an inner cylinder and an outer cylinder respectively, which are opposed to and frictional welded with each other corresponding to said inner cylinders and outer cylinders each other, and then a center space within said inner cylinder and an outer space surrounded by said inner cylinder and said outer cylinder are made. The present invention of a gas generator has a squib of which surface coated with an electrically insulating material, being inserted into said casing and fixed thereto, and the spontaneous firing explosive composition consisting of carbohydrates, oxohalogenates, metal oxides and a synthetic resins being contained in the squib. Even when the heat conductivity to the squib is restricted by the electrically insulating material, the spontaneous firing function is not deteriorated. When said squib is inserted into a cylindrical-shaped boss projected from said casing into said center space and fixed thereto, it is preferable that the cylindrical-shaped boss be larger in height than the portion of said friction welding to avoid thermal effects on the squib upon welding.

The squib, the igniting agents and the gas generant in the gas generator for the air bag all have their own important firing functions. The present gas generator will, of course, be subjected to high temperature environments during summer and may be mounted on a vehicle for many years. Hence, high-temperature stability without deteriorating the firing function is required, and can now be achieved using the metal oxides of the present explosive composition. The present spontaneously-firing explosive composition contained in either one of the squib, the igniting agent or the gas generant is fired by its spontaneous firing function before the mechanical strength of the casing of the gas generator is deteriorated significantly such as upon vehicle fire or warehouse fire. This firing is similar to a normal ignition upon, for example, collision, and breakage of the casing is thus avoided. This spontaneous firing function is ensured by the present metal oxides even when being subjected to a high temperature environment during summer for many years. More specifically, a state where the carbohydrates and oxohalogenates are separated stably is ensured by the metal oxides, whereby the carbohydrates melt at a predetermined spontaneous firing temperature and reach the oxohalogenates for firing.

When the above-mentioned spontaneous firing explosive composition is contained in the squib, the igniting agents or the gas generant, an exterior heat is first transferred from outside to the squib, the igniting agent or the gas generant and then finally to the explosive composition to be heated. Because of such indirect heating, the exterior heat may be less transferred depending on the environments of the present explosive composition. In such a case, the carbohydrates and oxohalogenates are stably separated by the present metal oxides even if the molten carbohydrates state is not stable. So that, a straggling in spontaneous firing temperature is possible. The present synthetic resins serve to reduce the straggling and, in turn, to reduce the spontaneous firing temperature. The synthetic resins form an adequate bridge among carbohydrates, oxohalogenates and metal oxides. The carbohydrates are melted stably by heat conductivity via this bridge and reach the oxohalogenates passing through the metal oxides and the synthetic resins, so that spontaneous firing is caused. To ensure such phenomenon, it is desirable that the metal oxides have a particular particle diameter and are present at a predetermined amount, and that the synthetic resins is also contained in a particular amount. However, the synthetic resins may be omitted when the heat conductivity to the spontaneous firing explosive composition is sufficient.

The gas generator of the present invention may be described in more detailed with reference to the drawings, in which the above-mentioned squib, igniting agents and gas generant are contained. While one of the squib and the igniting agents may be omitted, the following description is made in conjunction with a case where both of them are contained. FIG. 1 shows a sectional view of a gas generator 60 for an air bag according to the present invention.

In the gas generator 60 for an air bag in FIG. 1, a reference numeral 27 represents a lower casing made of an aluminum alloy which comprises an inner cylinder 27a and an outer cylinder 27b. A reference numeral 28 represents an upper casing also made of an aluminum alloy which comprises an inner cylinder 28a and an outer cylinder 28b. The inner cylinder 27a and the outer cylinder 27b are, respectively, opposed to the inner cylinder 28a and the outer cylinder 28b and joined by friction welding between A and B portions to form a casing. In addition, a sack-shaped projecting portion 27c is integrally formed with the lower casing 27 at a center thereof. A communication hole 27d is provided in the projecting portion 27c at a center thereof. Further, orifices 33 are opened in the inner cylinder 28a of the upper casing 28. Diffusers 36 are opened in the outer cylinder 28b of the upper casing 28.

As mentioned above, the casing comprises an circular outer space 35 surrounded by the outer cylinder 27b of the lower casing 27 and the outer cylinder 28b of the upper casing 28 and a center space 34 defined by a portion surrounded by the inner cylinder 27a of the lower casing 27 and the inner cylinder 28a of the upper casing 28 and inside of the projecting portion 27c. A igniting agents container 40 is contained in a portion surrounded by the inner cylinder 27a of the lower casing 27 and the inner cylinder 28a of the upper casing 28 in the center space 34. A squib 10 is contained in a position of the projecting portion 27c in the center space 34. The outer space 35 is divided by an inner wall 31 having orifices 32. A gas generant container 50 is contained inside the inner wall 31 while a first coolant 25 located at outlets of the orifices 32, a second coolant 26 and a filter 30 sealed with a filter cover 29 are contained exterior of the inner wall 31.

In particular, the squib 10 in the projection portion 27c is covered with an electrically insulating material 21 such as an elastomer and fixed with a caulking member 27e of the lower casing 27 through a ferrite cover 22, a first keep plate 23 and a second keep plate 24. When the squib 10 covered with the electrically insulating material 21, the electrically insulating material 21 serves as a heat insulating material too. Accordingly, exterior heat is mainly transferred to the squib 10 through a pair of lead pins 7 in case of vehicle fire or the like.

As shown in FIG. 1, to insert the squib 10 into the projecting portion 27c through the electrically insulating material 21, an accuracy of molding of the electrically insulating material 21 is required to a certain degree. With this respect, as in a gas generator 61 for air bag shown in FIG. 2, the sack-shaped projecting portion is replaced by a cylinder-shaped boss 27f. Most of portions of the electrically insulating material 21 and the squib 10 are projected into a position surrounded by the inner cylinder 27a of the lower casing 27 and the inner cylinder 28a of the upper casing 28 to provide easier assembly. In such a case, a height of the cylinder-shaped boss 27f is higher by a distance H than the friction welded site A to avoid thermal effect on the electrically insulating material 21 due to scattering burr as welding with friction. In addition, a bottom of the squib 10 abuts on the igniting agents container 40 through the electrically insulating material 21.

Standard operation of these gas generators, 60 and 61 for an air bag may be described. First, the explosive in the squib 10 is initiated when a predetermined electrical current is flown in a bridge which is not shown in FIG. 1 through the lead pins 7. A bottom of the squib is broken and then high-temperature and high pressure gas is discharged. This high-temperature gas breaks the igniting agents container 40 to cause the igniting agents contained therein to be fired. A high-temperature gas is generated as a result of burning of the igniting agents and passes through the orifices 33 and breaks the gas generant container 50 to cause the gas generant 51 contained therein to be ignited. A large amount of gas is generated as a result of burning of the gas generant 51. The generated gas passes through the orifices 32, the first coolant 25 and the second coolant 26 where cooling and collection of residues are made, then passes through the filter 30 where mists are removed and is discharged into an air bag which is not shown through the diffusers 36.

Figure 3:
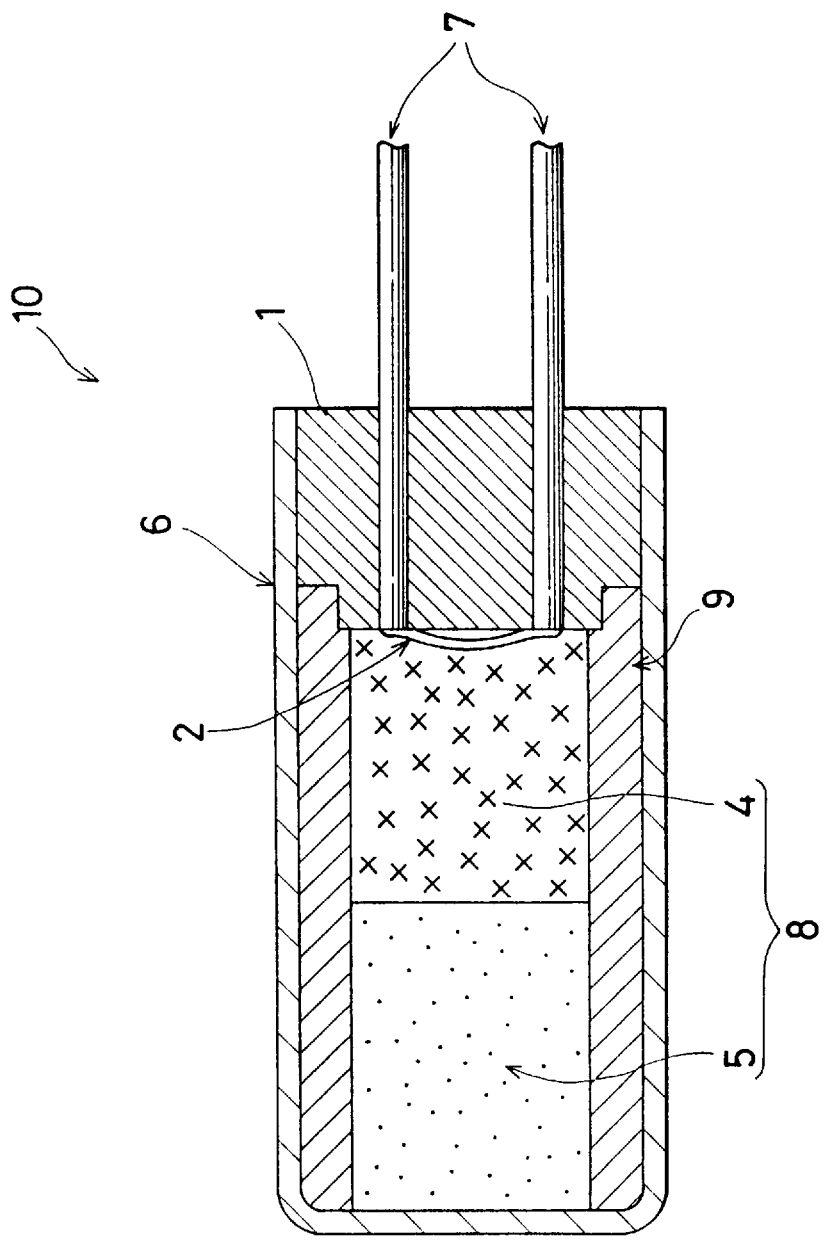
FIG. 3 is a sectional view of a squib containing a spontaneous firing explosive composition according to the present invention.
Figure 4:
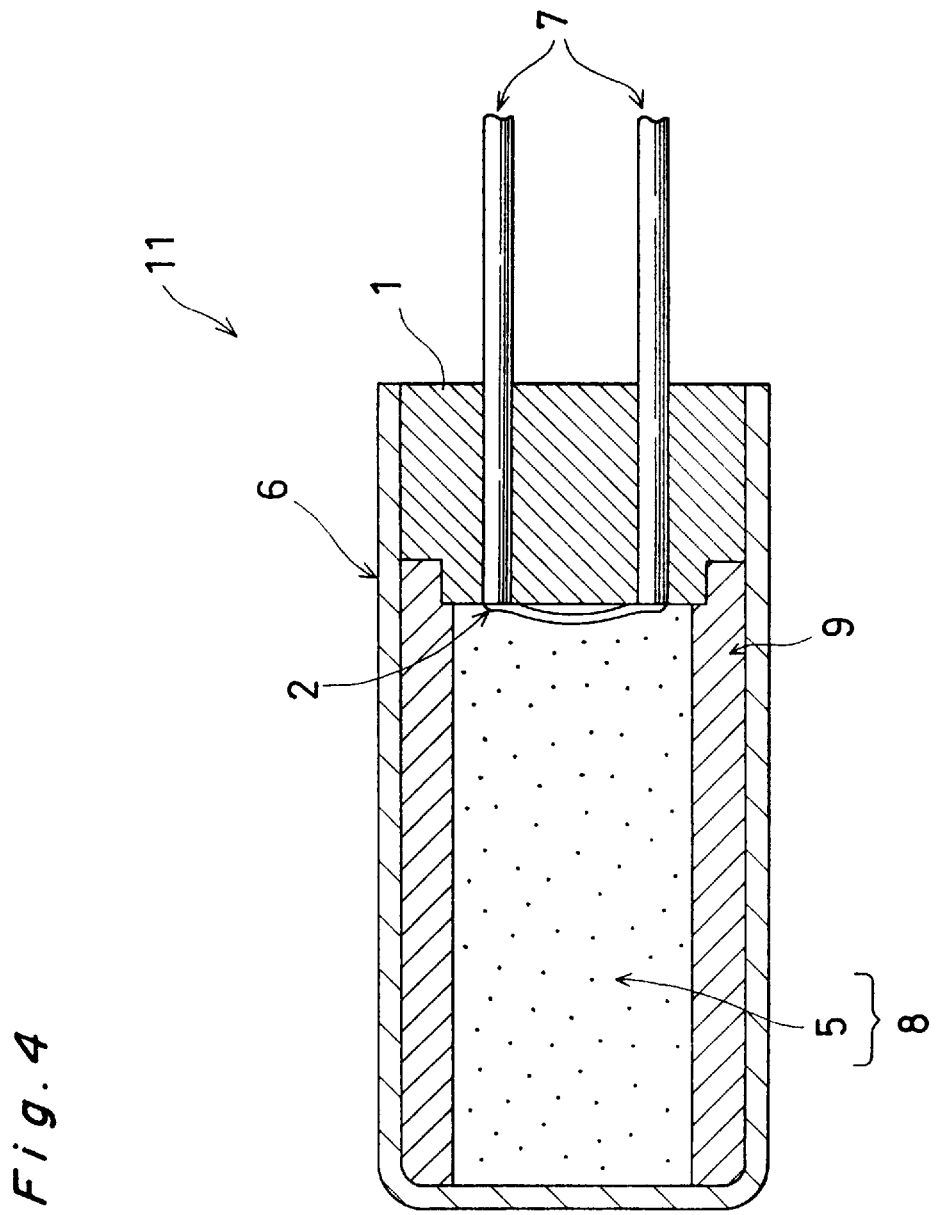
FIG. 4 is a sectional view of a squib containing a spontaneous firing explosive composition according to the present invention.
Figure 5:
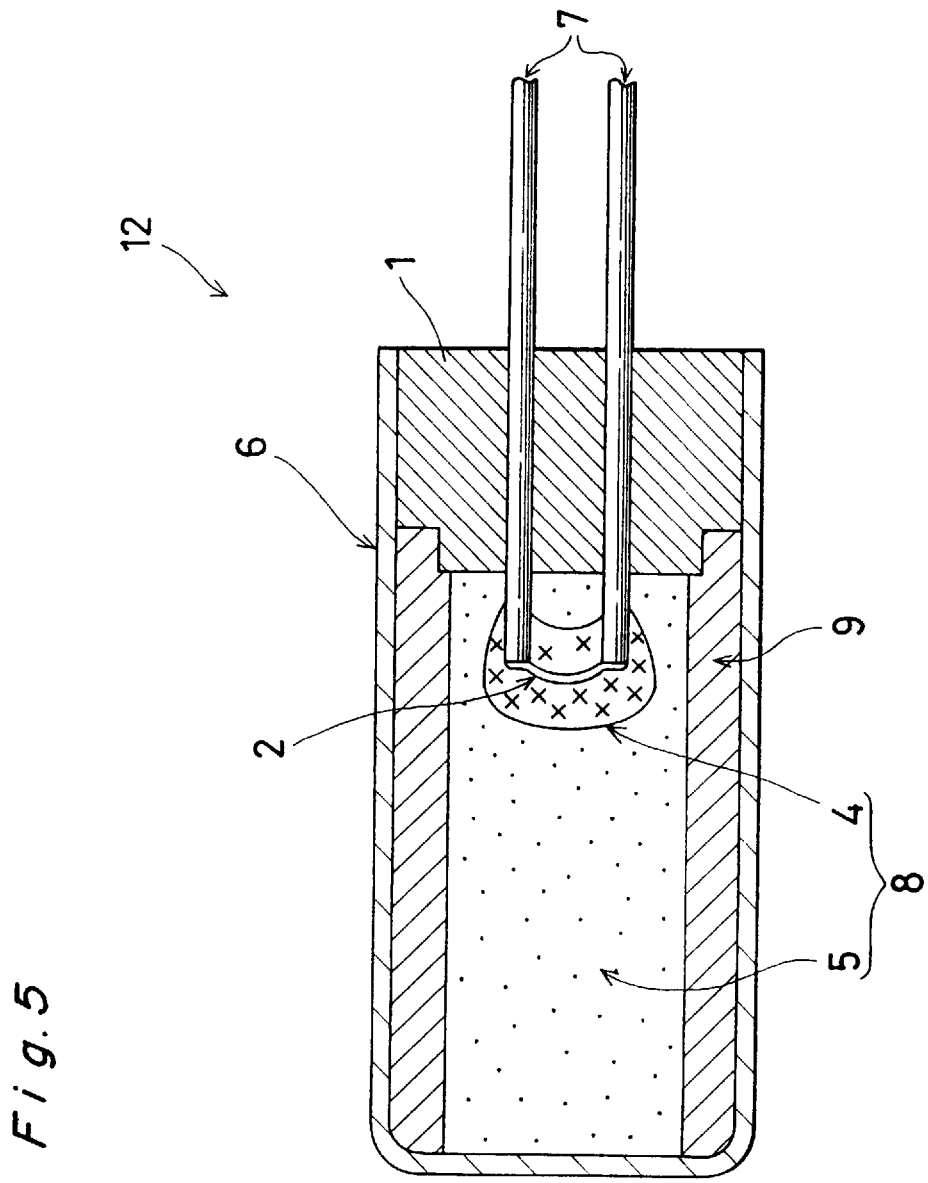
FIG. 5 is a sectional view of a squib containing a spontaneous firing explosive composition according to the present invention.

FIG. 3 shows an example where an initiating agents 4 and an spontaneous firing explosive composition 5 according to the present invention are aligned into a double layer structure within a magazine 8 of the squib 10. When the squib 10 is held in a manner as shown in FIG. 1, a portion of the squib 10 corresponding to the spontaneous firing explosive composition 5 is contained in the sack-shaped projecting portion 27c of the lower casing 27 with being coated with the electrically insulating material 21 which also serves as a heat insulating material. FIG. 4 shows an example where only the spontaneous firing explosive composition 5 according to the present invention is contained in the magazine 8 of a squib II. FIG. 5 shows an example where an explosive bullet as the initiating agents 4 for a squib 12 and covered with the spontaneous firing explosive composition 5 according to the present invention is contained in the magazine 8 of a squib 12.

Normal operation of the squibs 10 and 12 shown, respectively, in FIGS. 3 and 5 are as follows. First, when a predetermined electrical current is flown through electrode lead pins 7, the bridge 2 is heated, which causes the initiating agents 4 to he fired. Next, the explosive composition 5 is fired. The bottom of the squib is broken as the inside of the squib becomes high temperature and high pressure. As a result, a high temperature, high-pressure gas is discharged. When the squib 10 or 12 is heated from outside due to, for example, an accident, the spontaneous firing explosive composition 5 is spontaneously fired at the time when the temperature within the squib reaches 165°–220° C. or 165°–200° C. Next, the initiating agents 4 is fired. The end bottom of the squib is broken as the inside of the squib becomes high temperature and high pressure. As a result, a high temperature, high-pressure gas is discharged. Then, as described in conjunction with FIGS. 1 and 2, the igniting agent container 40 is broken and then the gas generant container 50 is broken. The high-temperature, high-pressure gas is thus successively generated.

A normal operation of the squib 11 shown in FIG. 4 is as follows. First, when a predetermined electrical current is flown through the electrode lead pins 7, the bridge 2 is heated, which causes the explosive composition 5 to be ignited. The bottom of the squib is broken as the inside of the squib becomes high temperature and high pressure. As a result, a high-temperature and high-pressure gas is discharged. When the squib 11 is heated from outside and then the temperature within the squib reaches 165°–220° C. or 165°–200° C., the spontaneous firing explosive composition 5 is spontaneously fired at the time. The bottom of the squib is broken as the inside of the squib becomes high temperature and high pressure. As a result, a high-temperature and high-pressure gas is discharged. Then, as described in conjunction with FIGS. 1 and 2, the igniting agents container 40 is broken and then the gas generant container 50 is broken. The high-temperature and high-pressure gas is thus successively generated.

Figure 2:
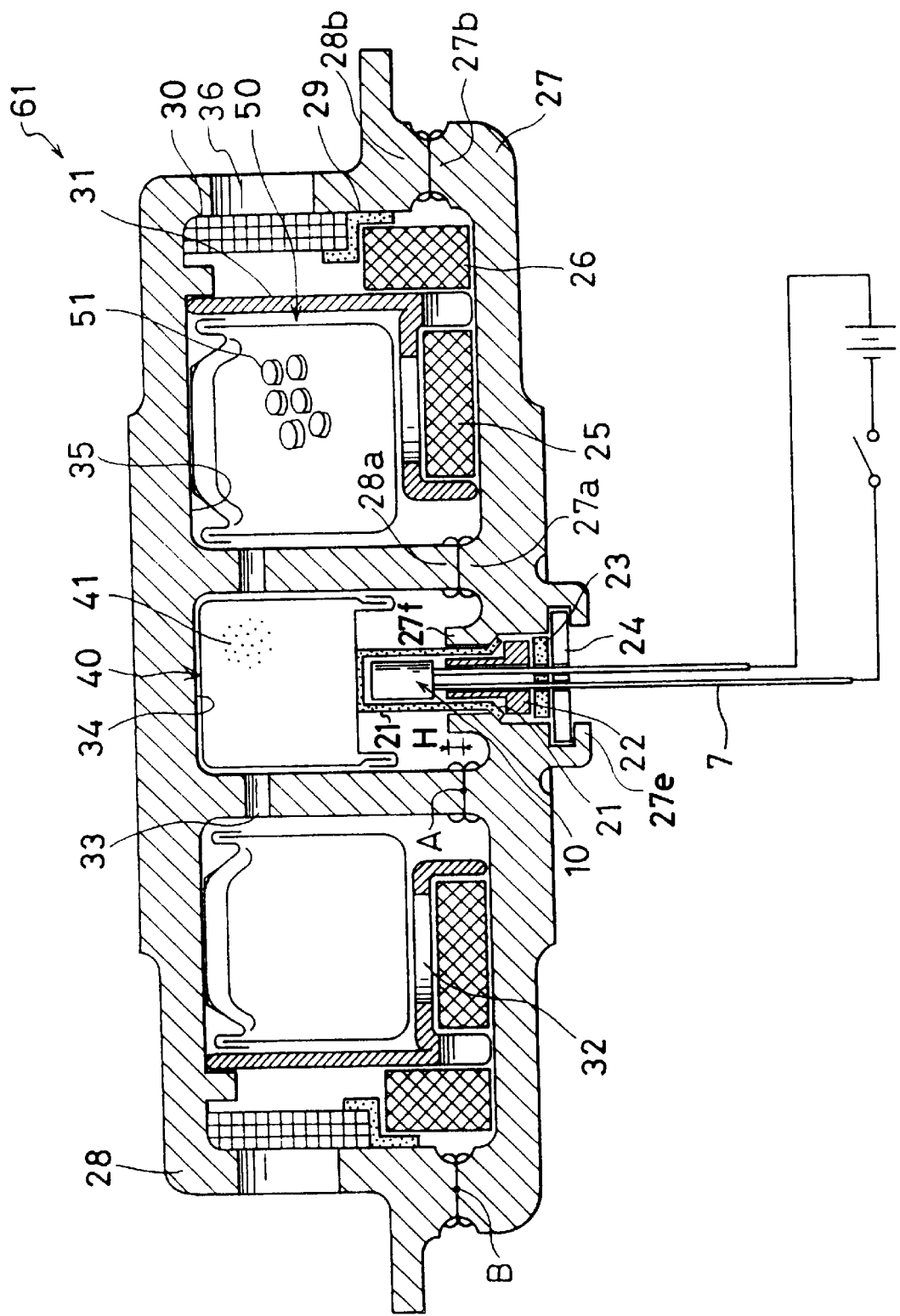
FIG. 2 is a sectional view of a gas generator for an air bag according to the present invention.

As mentioned above, the spontaneous firing explosive composition in FIGS. 3 through 5 is spontaneously fired at 165°–220° C. or 165°–200° C. Hence, when the casings 27 and 28 in FIGS. 1 and 2 are made of a light aluminum alloy, the spontaneous firing explosive composition is to be fired before the mechanical strength is deteriorated as the casing is heated due to firing or the like. Thus, there is no fear of breakage of the casing or scattering of broken pieces. In particular, when the spontaneous firing explosive composition according to the present invention is contained in the igniting agents container 40 or the gas generant container 50 in FIGS. 1 and 2, the squib may he left without firing. On the contrary, when the spontaneous firing explosive composition according to the present invention is contained in the squib, all explosive in the gas generator is fired.

In particular, as shown in FIGS. 1 and 2, when the heat conductivity to the squib 10 is restricted by the electrically insulating material 21 or a projection from the container, it is preferable that the spontaneous firing explosive composition is included a synthetic resins. In this case, the spontaneous firing explosive composition contains of carbohydrates, oxohalogenates, metal oxides, a synthetic resins, and is to be fired stably at a low temperatures of 165°–220° C.

Figure 6:
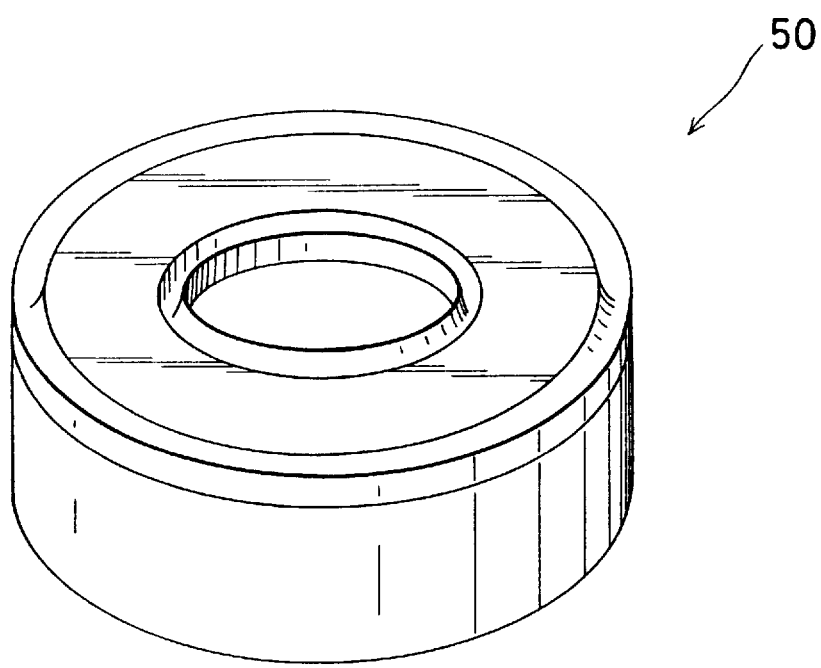
FIG. 6 is a perspective view of a gas generant container.

FIG. 6 shows an example of an appearance of the gas generant container 50. The gas generant is contained in a container formed of a cup of aluminum foil.

Figure 7:
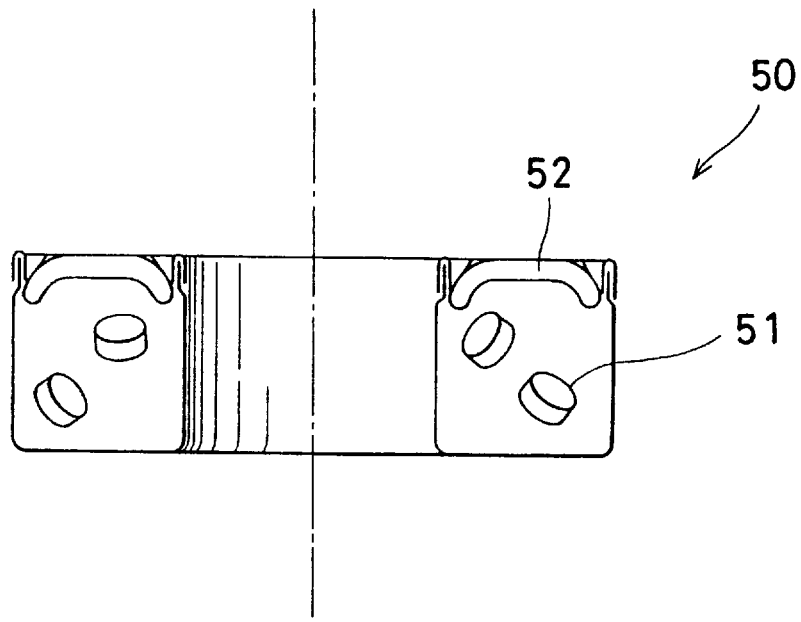
FIG. 7 is a sectional view of a gas generant container, in which pellets of a gas generant of a spontaneous firing explosive composition according to the present invention are contained.
Figure 8:
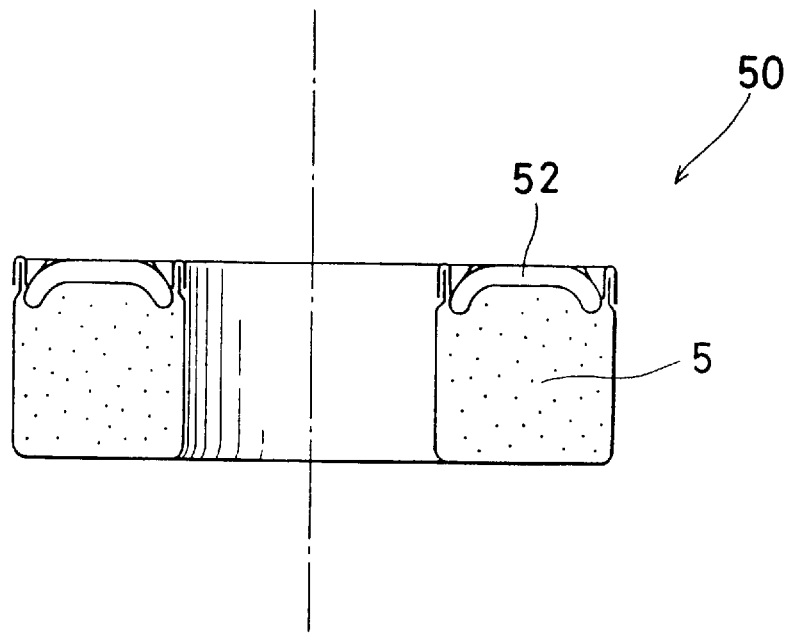
FIG. 8 is a sectional view of a gas generant container, in which powder of a gas generant of a spontaneous firing explosive composition according to the present invention is contained.

FIG. 7 shows an example of a sectional view where the spontaneous firing explosive composition according to the present invention is contained in the gas generant container 50 as the gas generant 51 of pellets shape. FIG. 8 shows an example of a sectional view where the spontaneous firing explosive composition according to the present invention is contained in the gas generant container 50 as the gas generant 51 of powder. In FIGS. 7 and 8, a reference numeral 52 represents a ceramic cushion material for use in avoiding oscillation and vibration of the gas generant.

In FIG. 1, in case of the gas generator 60 having this gas generant container 50 of which a gas generant is the spontaneous firing explosive composition 5 according to the present invention, and when the gas generant container 50 is heated from outside due to vehicle firing or warehouse firing and then a temperature of the gas generant (spontaneous firing explosive composition) 51 contained in the gas generant container 50 reaches 165°–220° C. or 165°–200° C., the gas generant (spontaneous firing explosive composition) 51 is spontaneously fired and breaks the gas generant container 50. A high temperature,gas passes through the orifices 33 and breaks the igniting agents container 40 to fire the igniting agents. At the same time, it is passed through the first coolant 25 and the second coolant 26, and is then discharged outward through the filter 30. The gas generant (spontaneous firing explosive composition) 51 in FIG. 7 or 8 is spontaneously fired at 165°–220° C or 165°–200° C., so that there is no fear of breakage of the casing and scattering of the broken pieces even if the lower casing 27 and the upper casing 28 in FIG. 1 is made of light aluminum alloy.

Figure 9:
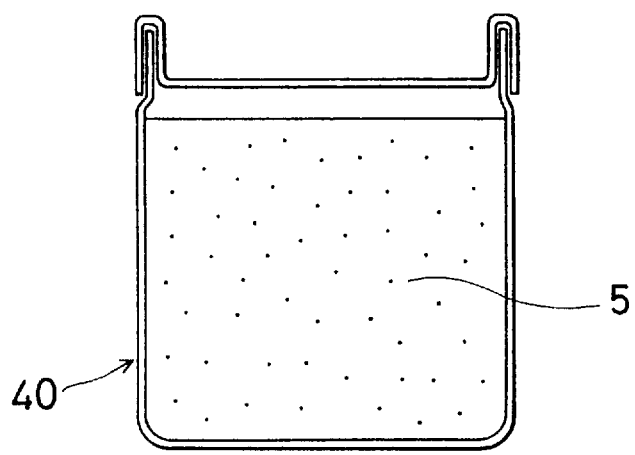
FIG. 9 is a sectional view of a igniting agents container, in which an igniting agent of a spontaneous firing explosive composition according to the present invention is contained.
Figure 10:
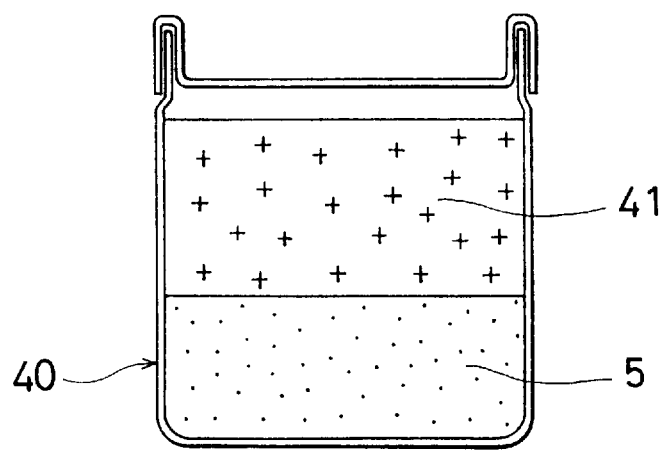
FIG. 10 is a sectional view of an igniting agent container, in which a firing agent of a spontaneous firing explosive composition according to the present invention is contained.

FIG. 9 shows an example where the spontaneous firing explosive composition 5 according to the present invention is contained in the igniting agents container 40. FIG. 10 shows an example where the spontaneous firing explosive composition 5 according to the present invention is contained in the igniting agents container 40 along with the igniting agents 41 made of boron/potassium nitrate with a two-layer structure.

In FIG. 1, in case of the gas generator 60 having this igniting agents container 40 heated from outside due to vehicle firing or warehouse firing, and then a temperature of the spontaneous firing explosive composition 5 contained in the igniting agents container 40 reaches 165°–220° C. or 165°–200° C., the spontaneous firing explosive composition 5 is spontaneously fired and breaks the igniting agents container 40. This discharges a high-temperature and high-pressure gas. The discharged gas passes through the orifices 33 and breaks the gas generant container 50 to fire the gas generant 51 contained therein. A large volume of gas is generated as a result of burning of the gas generant 51. The generated gas is passed through the first coolant 25 and the second coolant 26, and is then discharged outward through the filter 30. The spontaneous firing explosive composition 5 in FIGS. 9 or 10 is spontaneously fired at 165°–220° C. or 165°–200° C., so that there is no fear of breakage of the casing and scattering of the broken pieces even if the lower casing 27 and the upper casing 28 in FIG. 1 is made of light aluminum alloy.

The properties of the present spontaneously firing explosive composition are not deteriorated during heat aging tests at 120° C. for 100 hours or at 107° C. for 400 hours. These are considered to be the most of severe environments that might be caused in vehicles or the like under normal usage. In addition, the present expolsive composition can maintain the spontaneous firing function and other inherent ignition functions.

The present invention will now be described specifically and more fully by reference to certain examples and comparative examples which are provided solely for proposes of illustration and are not intended to be limitative.

First, are provided examples where a squib contained a spontaneously firing explosive composition (carbohydrates/oxohalogenates/metal oxides) according to the present invention containing no synthetic resins. This squib was assessed solely, too. The term "part" used in the examples and, throughout the specification, represents parts by weight.

EXAMPLES 1 THROUGH 3, COMPARATIVE EXAMPLES 1 THROUGH 3

Figure 11:
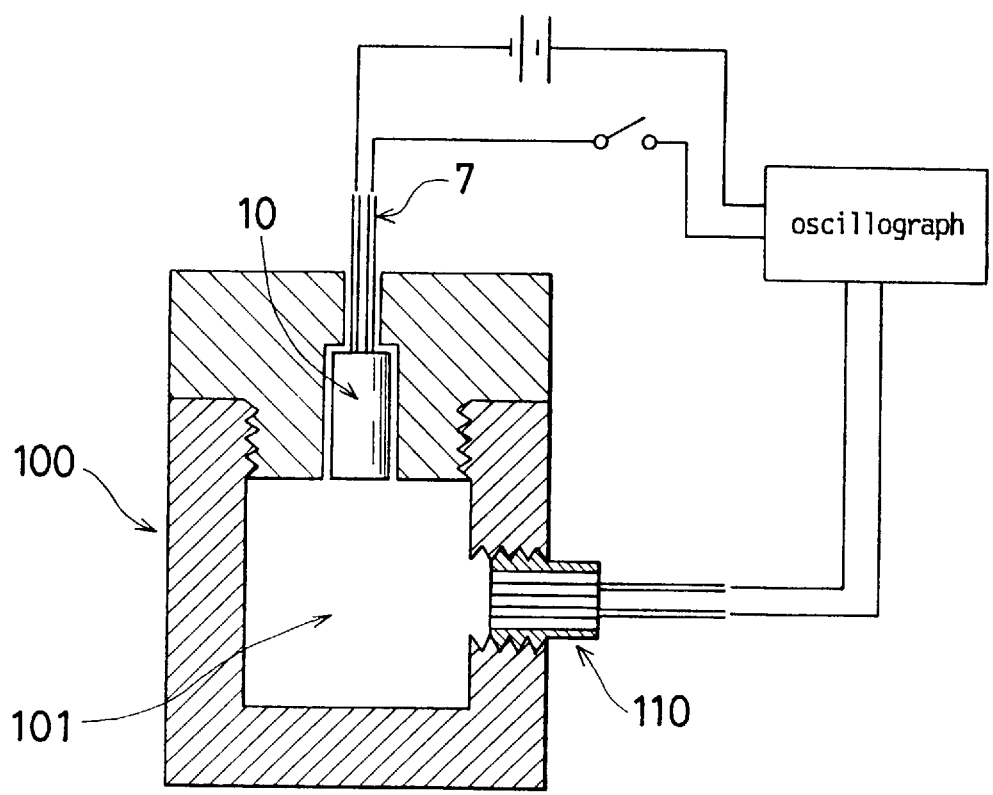
FIG. 11 is a view illustrating a squib containing a spontaneous firing explosive composition according to the present invention being attached to an pressure tester.

In FIG. 11, a pressure sensor 110 was attached to a SUS container 100 with a space 101 of a capacity of 10 milli-liters. The squib 10 was attached to a lid of the SUS container 100. The electrode lead pins 7 of the squib 10 were connected to a squib ignition power source and an oscillograph for current measurement.

A terminal of the pressure sensor 110 was connected to the measurement oscillograph. A predetermined electrical current was flown across the squib to ignite it. An initiating time t (msec.) and a maximum generated pressure value $P_{max}$ (psi) were measured. An initiating time t in Table 1 means a time interval from time when electrical current has finished flowing through the squib to time of starting raising the pressure.

A spontaneous firing explosive composition was prepared as follows. 1.2 parts of super fine powder of light magnesium oxide (reagent; Wako Pure Chemical Industries Co., Ltd.) having an average particle diameter of 0.001 mm or smaller was added to and mixed with 74.8 parts of potassium chlorate (reagent; Wako Pure Chemical Industries Co., Ltd.) having an average particle diameter of 0.2 mm. After mixing, it was found that the magnesium oxide was coated on the surfaces of the potassium chlorate when observed through an optical microscope. Next, 1.0 parts of said light magnesium oxide (reagent; Wako Pure Chemical Industries Co., Ltd.) was added to and mixed with 23.0 parts of sucrose (Taito Corporation) having an average particle diameter of 0.05 mm. After mixing, it was found that the surfaces of the sucrose was coated with the magnesium oxide when observed through an optical microscope. The above mentioned total amount of potassium chlorate/magnesium oxide and sucrose/magnesium oxide were mixed with each other to obtain the spontaneous firing explosive composition.

The squib was assembled in a following manner. A squib sheath 9 was placed in the squib cup 6 as shown in FIG. 3, in which 40 mg of the spontaneous firing explosive composition 5 was added. Subsequently, 120 mg of the initiating agents 4 (zirconium/potassium perchlorate) were placed and a squib sealing plug 1 was engaged therewith. For comparison, a explosive of sucrose/potassium chlorate with no magnesium oxide added. In addition, a squib was assembled in the same manner as those described above. Histories of the squibs were following three of types: the room temperature only, 120° C.×100 hours and 107° C.×400 hours. The results are given in Table 1. For comparative examples, the explosives were non-initiating in both 120° C.×100 hours and 107° C.×400 hours. On the contrary, no change in pressure was found for those according to the present invention.

EXAMPLES 4 THROUGH 6, COMPARATIVE EXAMPLES 4 THROUGH 6

Figure 12:
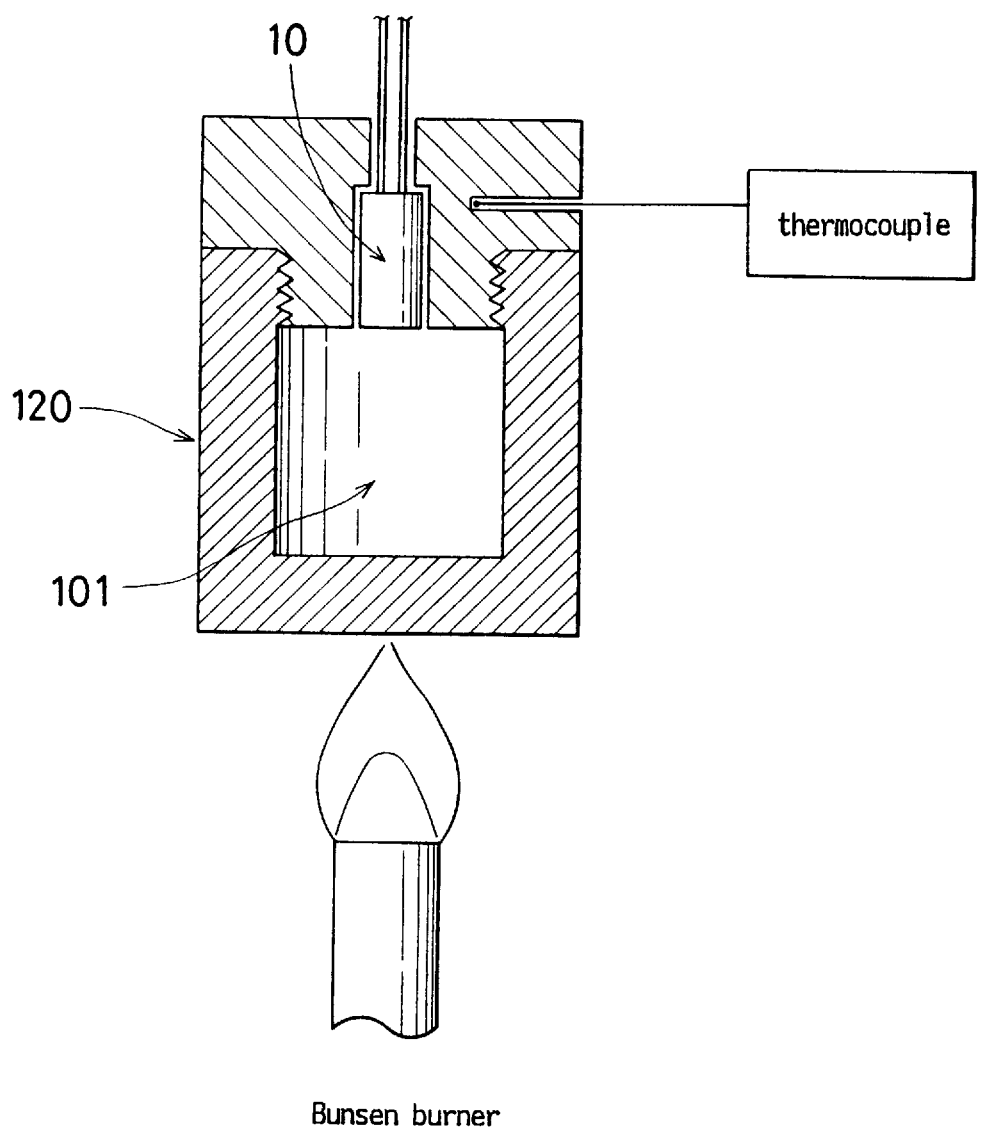
FIG. 12 is a view illustrating a squib containing a spontaneous firing explosive composition according to the present invention being attached to an initiating tester.

In FIG. 12, the squib 10 was attached to a lid of a SUS container 120 having a space 101 of a capacity of 10 milli-liters.

A hole for temperature measurement was formed in the lid, in which a thermocouple was inserted to monitor temperature in the container. The container 120 was heated with a Bunsen burner. The container temperature at which the squib was spontaneously fired were recorded. The squib was as same as that used in the above mentioned examples. The results are given in Table 2. For comparative examples, the explosives were misfired in both 120° C.×100 hours and 107° C.×400 hours. On the contrary, those according to the present invention were all fired spontaneously at and around 200° C. after the above mentioned heat-aging tests.

EXAMPLES 7 THROUGH 9, COMPARATIVE EXAMPLES 7 THROUGH 9

In FIG. 1, the same squib as the one described in said examples was attached to a gas generator of an aluminum casing where the amount of the gas generant pellets 51 and the igniting agents 41 were respectively 55 gram and 1.7 gram. The gas generator was suspended in the air and subjected to a bonfire test with being heated by flame generated by firewood to be spontaneously fired. A heating time until spontaneous firing and a state of the gas generator after firing were observed. The results are given in Table 3. For comparative examples, the heat aging tests of 120° C.×100 hours and 107° C.×400 hours both resulted in casing breakage. On the contrary, those according to the present invention were approximately similar to the state of room temperature.

TABLE 1

Effect of MgO on Squib temperature history (1)
-Squib initiating test-

| | No | history of Squib temperature | explosive composition MgO | initiating time t (msec) | rated pressure Pmax (psi.) |
|---|---|---|---|---|---|
| Examples | 1 | room temperature | presence | 1.10 | 1,250 |
| | 2 | 120° C. 100 hours | presence | 1.05 | 1,210 |
| | 3 | 107° C. 400 hours | presence | 1.08 | 1,190 |
| Comparative Examples | 1 | room temperature | absence | 0.95 | 1,280 |
| | 2 | 120° C. 100 hours | absence | non-initiate | — |
| | 3 | 107° C. 400 hours | absence | non-initiate | — |

TABLE 2

Effect of MgO on Squib temperature history (2)
-Squib spontaneous firing test-

| | No | history of Squib temperature | explosive composition MgO | container temperature upon firing °C. | heating time | comments |
|---|---|---|---|---|---|---|
| Examples | 4 | room temperature | presence | 203 | 2 min. 40 sec. | |
| | 5 | 120° C. 100 hours | presence | 210 | 2 min. 50 sec. | |
| | 6 | 107° C. 400 hours | presence | 208 | 2 min. 45 sec. | |
| Comparative Examples | 4 | room temperature | absence | 188 | 2 min. 23 sec. | |
| | 5 | 120° C. 100 hours | absence | misfire | — | stop heating at container temperature of 300° C. |
| | 6 | 107° C. 400 hours | absence | misfire | — | stop heating at container temperature of 300° C. |

TABLE 3

Effect of MgO on Squib temperature history (3)
-Bonfire test-

| | No | history of Squib temperature | explosive composition MgO | heating time | Appearance of gas generator after firing |
|---|---|---|---|---|---|
| Examples | 7 | room temperature | presence | 2 min. 25 sec. | No-trouble |
| | 8 | 120° C. 100 hours | presence | 2 min. 38 sec. | No-trouble |
| | 9 | 107° C. 400 hours | presence | 2 min. 33 sec. | No-trouble |
| Comparative Examples | 7 | room temperature | absence | 2 min. 17 sec. | No-trouble |
| | 8 | 120° C. 100 hours | absence | 5 min. 03 sec. | casing breakage |
| | 9 | 107° C. 400 hours | absence | 4 min. 38 sec. | casing breakage |

Next, illustrated are examples where a spontaneously-firing explosive composition (carbohydrates/oxohalogenates/metal oxides based) according to the present invention was contained in the gas generant.

EXAMPLES 10 THROUGH 18, 19 THROUGH 21

An spontaneous firing explosive composition was prepared as follows. 1.2 parts of super fine powder of light magnesium oxide (reagent; Wako Pure Chemical Industries Co., Ltd.) having an average particle diameter of 0.001 mm or smaller was added to and mixed with 74.8 parts of potassium chlorate (reagent; Wako Pure Chemical Industries Co., Ltd.) having an average particle diameter of 0.2 mm. After mixing, it was found that the surfaces of the potassium chlorate was coated with the magnesium oxide when observed through an optical microscope. Next, 1.0 parts of said light magnesium oxide (reagent; Wako Pure Chemical Industries Co., Ltd.) were added to and mixed with 23.0 parts of sucrose (Taito Corporation) having an average particle diameter of 0.05 mm. After mixing, it was found that the surfaces of the sucrose was coated with the magnesium oxide when observed through an optical microscope. The above mentioned total amount of potassium chlorate/magnesium oxide and sucrose/magnesium oxide were mixed with each other to obtain the spontaneous firing explosive composition.

This spontaneous firing explosive composition was placed in a mill of which diameter is 10 mm and press-molded under a load of 500 kilo-gram. And then pellets of the gas generant were obtained. Its weight of one pellet is approximately 0.6 gram. As shown in FIG. 7, the above mentioned pellets 30 gram were placed in the gas generant container 50 and sealed as shown in FIG. 6. Twelve containers such as the above mentioned generant containers 50 were ready. We applied three types of temperature histories. Here are: room temperature, 120° C.×100 hours and 107° C.×400 hours. We used four containers to each types. Thereafter, as shown in FIG. 1, the gas generator 60 made of the aluminum casing was assembled. The gas generator 60 contains the squib 10 having zirconium/potassium Perchlorate 120 milli-gram, the igniting agents container 40 having the igniting agents (boron/potassium nitrate) 1.0 gram and the above mentioned gas generant container 50. This gas generator 60 was used for test of a pressure-time with a 60-liter tank and a heating test with firewood (bonfire test). The results are given in Table 4 and Table 6. Differences in temperature histories during the 60-liter tank pressure-time test were slight. During the bonfire test, there were no differences in temperature histories found. An igniting time "t" in Table 4 is a time interval from time when electrical current has finished flowing through the squib to time of starting raising the pressure.

COMPARATIVE EXAMPLES 10 THROUGH 18, 19 THROUGH 21

For comparison with the above mentioned examples, the gas generant was made of a sucrose/potassium chlorate without adding magnesium oxide. As in the above, the gas generant without magnesium oxide was placed in a mill of which the diameter is 10 mm and press-molded under a load of 500 kilo-gram. And then pellets of the gas generant were obtained. Its weight of one pellet is approximately 0.6 gram. As shown in FIG. 7, the above mentioned pellets 30 gram were placed in the gas generant container 50 and sealed as shown in FIG. 6. Twelve containers such as the above mentioned generant containers 50 were ready. We applied three types of temperature histories. Here are: room temperature, 120° C.×100 hours and 107° C.×400 hours. We used four containers to each types. Thereafter, as shown in FIG. 1, the gas generator 60 made of the aluminum casing was assembled. The gas generator 60 contains the squib 10 having zirconium/potassium Perchlorate 120 mille-gram, the igniting agents container 40 having the igniting agents (boron/potassium nitrate) 1.0 gram and the above mentioned gas generant container 50. This gas generator 60 was used for test of a pressure-time with a 60-liter tank and a heating test with firewood (bonfire test). The results are given in Table 5 and Table 6. During the 60-liter tank pressure-time test, no gas generant was ignited with the temperature histories of 120° C.×100 hours and 107° C.×400 hours. During the bonfire test, gas generation were made abnormally with the temperature histories of 120° C.×100 hours and 107° C.×400 hours.

TABLE 4

Effect of MgO on temperature history of gas generant pellets (1)
-60-liter tank test-

|  | No | temperature history of gas generant | presence or absence of MgO | gas generator test temperature | igniting time t (msec) | maximum pressure KPa | maximum pressure time (msec) | abnormal appearance |
|---|---|---|---|---|---|---|---|---|
| Examples | 10 | room temperature | presence | room temperature | 6.6 | 223.3 | 58.3 | none |
|  | 11 |  |  | 85° C. | 6.0 | 288.1 | 55.7 | none |
|  | 12 |  |  | −40° C. | 8.8 | 170.2 | 66.4 | none |
|  | 13 | 120° C. 100 hours | presence | room temperature | 7.2 | 219.4 | 57.5 | none |
|  | 14 |  |  | 85° C. | 5.9 | 277.0 | 53.8 | none |
|  | 15 |  |  | −40° C. | 9.2 | 176.6 | 69.7 | none |
|  | 16 | 107° C. 400 hours | presence | room temperature | 7.8 | 230.2 | 60.2 | none |
|  | 17 |  |  | 85° C. | 6.5 | 266.1 | 55.4 | none |
|  | 18 |  |  | −40° C. | 8.9 | 165.8 | 65.3 | none |

TABLE 5

Effect of MgO on temperature history of gas generant pellets(2)
-60-liter tank test-

| No. | temperature history of gas generant | presence of absence of MgO | gas generator test temperature | igniting time t (msec) | maximum pressure KPa | maximum pressure time(msec) | abnormal appearance |
|---|---|---|---|---|---|---|---|
| Comparative Examples | | | | | | | |
| 10 | room temperature | absence | room temperature | 6.0 | 240.5 | 51.1 | none |
| 11 | | | 85° C. | 5.5 | 299.9 | 49.3 | none |
| 12 | | | −40° C. | 8.4 | 200.6 | 59.1 | none |
| 13 | 120° C. 100 hours | absence | room temperature | non-ignite | — | — | — |
| 14 | | | 85° C. | non-ignite | — | — | — |
| 15 | | | −40° C. | non-ignite | — | — | — |
| 16 | 107° C. 400 hours | absence | room temperature | non-ignite | — | — | — |
| 17 | | | 85° C. | non-ignite | — | — | — |
| 18 | | | −40° C. | non-ignite | — | — | — |

TABLE 6

Effect of MgO on temperature history of gas generant pellets (3)
-Bonfire test-

| | No | temperature history of gas generant | presence or absence of MgO | heating time | Appearance of gas generator after firing |
|---|---|---|---|---|---|
| Examples | 19 | room temperature | presence | 2 min. 35 sec. | No-trouble |
| | 20 | 120° C. 100 hours | presence | 2 min. 51 sec. | No-trouble |
| | 21 | 107° C. 400 hours | presence | 2 min. 38 sec. | No-trouble |
| Comparative Examples | 19 | room temperature | absence | 2 min. 13 sec. | No-trouble |
| | 20 | 120° C. 100 hours | absence | 4 min. 39 sec. | misfire gas generants |
| | 21 | 107° C. 400 hours | absence | 5 min. 12 sec. | misfire gas generants |

EXAMPLES 22 THROUGH 30, 31 THROUGH 33

An spontaneous firing explosive composition was prepared as follows. 23.0 parts of wood powder having an average particle diameter of 0.05 mm was added to and mixed with 1.0 parts of said light magnesium oxide(reagent; Wako Pure Chemical Industries Co., Ltd.), to which 76.0 parts of potassium chlorate/magnesium oxide mixture prepared in said examples was added and mixed with each other. 24.0 parts of the above mentioned wood powder/potassium chlorate/magnesium oxide composition was mixed with 76.0 parts of spontaneous firing explosive composition based on sucrose/potassium chlorate/magnesium oxide prepared in said examples to obtain gas generant in the form of powder. As shown in FIG. 8, the above mentioned gas generant 30 gram was placed in the gas generant container 50 and sealed as shown in FIG. 6. Twelve containers such as the above mentioned generant containers 50 were ready. We applied three types of temperature histories. Here are: room temperature, 120° C.×100 hours and 107° C.×400 hours. We used four containers to each types. Thereafter, as shown in FIG. 1, the gas generator 60 made of the aluminum casing was assembled. The gas generator 60 contains the squib 10 having zirconium/potassium perchlorate 120 milli-gram, the igniting agent container 40 having the igniting agent (boron/potassium nitrate) 1.0 gram and the above mentioned gas generant container 50. This gas generator 60 was used for test of a pressure-time with a 60 liter tank and a heating test with firewood (bonfire test). The results are given in Table 7 and Table 9. Differences in temperature histories during the 60-liter tank pressure-time test were slight. During the bonfire test, there were no differences in temperature histories found.

COMPARATIVE EXAMPLES 22 THROUGH 30, 31 THROUGH 33

The gas generant was made of a wood powder/sucrose/potassium chlorate mixture without adding magnesium oxide by the same manner in the above mentioned examples 22 to 30. As shown in FIG. 8, the above mentioned gas generant 30 gram was placed in the gas generant container 50 and sealed as shown in FIG. 6. Twelve containers such as the above mentioned generant containers 50 were ready. We applied three types of temperature histories. Here are: room temperature, 120° C.×100 hours and 107° C.×400 hours. We used four containers to each types. Thereafter, as shown in FIG. 1, the gas generator 60 made of the aluminum casing was assembled. The gas generator 60 contains the squib 10 having zirconium/potassium perchlorate 120 milli-gram, the igniting agents container 40 having the igniting agents (boron/potassium nitrate) 1.0 gram and the above mentioned gas generant container 50. This gas generator 60 was used for test of a pressure-time with a 60-liter tank and a heating test with firewood (bonfire test). The results are given in Table 8 and Table 9. During the 60-liter tank pressure-time test, no gas generant was ignited with the temperature histories of 120° C.×100 hours and 107° C.×400 hours. During the bonfire test, gas generation were made abnormally with the temperature histories of 120° C.×100 hours and 107° C.×400 hours.

TABLE 7

Effect of MgO on temperature history of gas generant powder (1)
-60-liter tank test-

| | No | temperature history of gas generant | presence or absence of MgO | gas generator test temperature | igniting time t (msec) | maximum pressure KPa | maximum pressure time (msec) | abnormal appearance |
|---|---|---|---|---|---|---|---|---|
| Examples | 22 | room temperature | presence | room temperature | 5.5 | 235.2 | 60.9 | none |
| | 23 | | | 85° C. | 4.9 | 271.1 | 51.3 | none |
| | 24 | | | −40° C. | 7.2 | 160.4 | 70.3 | none |
| | 25 | 120° C. 100 hours | presence | room temperature | 5.3 | 240.0 | 63.8 | none |
| | 26 | | | 85° C. | 5.1 | 281.3 | 61.0 | none |
| | 27 | | | −40° C. | 6.6 | 176.5 | 73.9 | none |
| | 28 | 107° C. 400 hours | presence | room temperature | 4.8 | 226.6 | 59.4 | none |
| | 29 | | | 85° C. | 4.9 | 267.2 | 52.0 | none |
| | 30 | | | −40° C. | 7.0 | 180. | 75.5 | none |

TABLE 8

Effect of MgO on temperature history of gas generant powder (2)
-60-liter tank test-

| | No | temperature history of gas generant | presence or absence of MgO | gas generator test temperature | igniting time t (msec) | maximum pressure KPa | maximum pressure time (msec) | abnormal appearance |
|---|---|---|---|---|---|---|---|---|
| Comparative Examples | 22 | room temperature | absence | room temperature | 5.3 | 240.5 | 58.8 | none |
| | 23 | | | 85° C. | 4.5 | 288.1 | 53.4 | none |
| | 24 | | | −40° C. | 8.0 | 190.3 | 70.3 | none |
| | 25 | 120° C. 100 hours | absence | room temperature | non-ignite | — | — | — |
| | 26 | | | 85° C. | non-ignite | — | — | — |
| | 27 | | | −40° C. | non-ignite | — | — | — |
| | 28 | 107° C. 400 hours | absence | room temperature | non-ignite | — | — | — |
| | 29 | | | 85° C. | non-ignite | — | — | — |
| | 30 | | | −40° C. | non-ignite | — | — | — |

TABLE 9

Effect of MgO on temperature history of gas generant powder (3)
-Bonfire test-

| | No | temperature history of gas generant | presence or absence of MgO | heating time | Appearance of gas generator after firing |
|---|---|---|---|---|---|
| Examples | 31 | room temperature | presence | 2 min. 43 sec. | No-trouble |
| | 32 | 120° C. 100 hours | presence | 2 min. 47 sec. | No-trouble |
| | 33 | 107° C. 400 hours | presence | 2 min. 33 sec. | No-trouble |
| Comparative Examples | 19 | room temperature | absence | 2 min. 28 sec. | No-trouble |
| | 20 | 120° C. 100 hours | absence | 5 min. 02 sec. | misfire gas generant |
| | 21 | 107° C. 400 hours | absence | 4 min. 51 sec. | misfire gas generant |

Next, illustrated are examples where a spontaneous firing explosive composition (carbohydrates/oxohalogenates/metal oxides) according to the present invention was contained in igniting agents.

EXAMPLES 34 THROUGH 42, 43 THROUGH 45

A spontaneous firing explosive composition was prepared as follows. 1.2 parts of said light magnesium oxide (reagent; Wako Pure Chemical Industries Co., Ltd.) was added to and mixed with 74.8 parts of potassium chlorate oxide(reagent; Wako Pure Chemical Industries Co., Ltd.) having an average particle diameter of 0.2 mm. After mixing, it was found that the surfaces of the potassium chlorate was coated with the magnesium oxide when observed through an optical microscope. Next, 1.0 parts of said light magnesium (reagent; Wako Pure Chemical Industries Co., Ltd.) was added to and mixed with 23.0 parts of sucrose (Taito Corporation) having an average particle diameter of 0.05 mm. After mixing, it was found that the surfaces of the sucrose was coated with the magnesium oxide when observed through an optical microscope. The above mentioned total amount of potassium chlorate/magnesium oxide and sucrose/magnesium oxide were mixed with each other to obtain the spontaneous firing explosive composition.

As shown in FIG. 9, the above mentioned explosive composition 1.0 gram was placed in the igniting agents container 40 and sealed. Twelve containers such as the above mentioned igniting agents containers 40 were ready. We applied three types of temperature histories. Here are: room temperature, 120° C.×100 hours and 107° C.×400 hours. We used four containers to each types. Thereafter, as shown in FIG. 1, the gas generator 60 made of the aluminum casing was assembled. The gas generator 60 contains the squib 10 having zirconium/potassium Perchlorate 120 milligram, the gas generant container 50 having the gas generant 55 gram of based on sodium azide, and the igniting agents container 40 having the above mentioned spontaneous firing explosive composition. This gas generator 60 was used for test of a pressure-time with a 60-liter tank and a heating test with firewood (bonfire test). The results are given in Table 10 and Table 12. Differences in temperature histories during the 60 liter tank pressure-time test were slight. During the bonfire test, there were no differences in temperature histories found. An igniting time t in Table 10 and Table 11 means a time interval from time when electrical current has finished flowing through the squib to time of starting raising the pressure. A heating time t in Table 12 means a time for the gas generator 60 to fire. Maximum pressure time means a time for pressure to become maximum.

COMPARATIVE EXAMPLES 34 THROUGH 42, 43 THROUGH 45

For comparison with the above mentioned examples, igniting agents 41 were made of a sucrose/potassium chlorate without adding magnesium oxide. As in the above, the igniting agents 41 without magnesium oxide were placed in the igniting agents container 40 as in said examples. Twelve containers such as the above mentioned igniting agents containers 40 were ready. We applied three types of temperature histories. That is: room temperature, 120° C.×100 hours and 107° C.×400 hours. We used four containers to each types. Thereafter, as shown in FIG. 1, the gas generator of the same specifications as in said examples except for the igniting agents were assembled. This gas generator is used for conducting the same assessment tests as in said examples. The results are given in Table 11 and Table 12. During the 60-liter tank pressure-time test, the explosives were all non-ignited and the gas generant was failed to be ignored with the temperature histories of 120° C.×100 hours and 107° C.×400 hours. During the bonfire test, the casings were broken down with the temperature histories of 120° C.×100 hours and 107° C.×400 hours.

TABLE 10

Effect of MgO on igniting agents temperature history (1)
-60-liter tank test-

|  | No | temperature history of igniting agents | presence or absence of MgO | gas generator test temperature | igniting time t (msec) | maximum pressure KPa | maximum pressure time (msec) | abnormal appearance |
|---|---|---|---|---|---|---|---|---|
| Examples | 34 | room temperature | presence | room temperature | 5.0 | 150.4 | 54.0 | none |
|  | 35 |  |  | 85° C. | 3.8 | 178.6 | 42.8 | none |
|  | 36 |  |  | −40° C. | 6.3 | 135.3 | 59.4 | none |
|  | 37 | 120° C. 100 hours | presence | room temperature | 4.8 | 147.2 | 52.0 | none |
|  | 38 |  |  | 85° C. | 3.9 | 175.3 | 41.9 | none |
|  | 39 |  |  | −40° C. | 6.6 | 137.7 | 58.3 | none |
|  | 40 | 107° C. 400 hours | presence | room temperature | 5.2 | 149.5 | 53.3 | none |
|  | 41 |  |  | 85° C. | 4.1 | 175.2 | 40.8 | none |
|  | 42 |  |  | −40° C. | 6.1 | 138.8 | 58.4 | none |

TABLE 11

Effect of MgO on igniting agents temperature history (2)
-60-liter tank test-

|  | No | temperature history of igniting agents | presence or absence of MgO | gas generator test temperature | igniting time t (msec) | maximum pressure KPa | maximum pressure time (msec) | abnormal appearance |
|---|---|---|---|---|---|---|---|---|
| Comparative Examples | 34 | room temperature | absence | room temperature | 4.8 | 155.5 | 53.6 | none |
|  | 35 |  |  | 85° C. | 4.0 | 177.4 | 40.7 | none |
|  | 36 |  |  | −40° C. | 6.1 | 129.1 | 60.3 | none |
|  | 37 | 120° C. 100 hours | absence | room temperature | non-igniting | — | — | — |
|  | 38 |  |  | 85° C. | non-igniting | — | — | — |
|  | 39 |  |  | −40° C. | non-igniting | — | — | — |
|  | 40 | 107° C. 400 hours | absence | room temperature | non-igniting | — | — | — |
|  | 41 |  |  | 85° C. | non-igniting | — | — | — |
|  | 42 |  |  | −40° C. | non-igniting | — | — | — |

TABLE 12

Effect of MgO on igniting agents temperature history (2)
-Bonfire test-

|  | No | temperature history of igniting agents | presence or absence of MgO | heating time | Appearance of gas generator after firing |
|---|---|---|---|---|---|
| Examples | 43 | room temperature | presence | 2 min. 35 sec. | No-trouble |
|  | 44 | 120° C. 100 hours | presence | 2 min. 44 sec. | No-trouble |
|  | 45 | 107° C. 400 hours | presence | 2 min. 50 sec. | No-trouble |
| Comparative Examples | 43 | room temperature | absence | 2 min. 28 sec. | No-trouble |
|  | 44 | 120° C. 100 hours | absence | 4 min. 52 sec. | casing breakage |
|  | 45 | 107° C. 400 hours | absence | 5 min. 01 sec. | casing breakage |

Next, described in conjunction with Table 13 are various exemplified combinations of carbohydrates and metal oxides in a three-component spontaneous firing explosive composition of carbohydrates/oxohalogenates/metal oxides.

EXAMPLES 46 THROUGH 48, COMPARATIVE EXAMPLE 46 THROUGH 51

The combination given in Table 2 was mixed at the following ratio to prepare a explosive composition.

Sucrose (Taito Corporation) 23.0% by weight (Example 46, Comparative Examples 46 and 47)

Dextrin (reagent;Kishida Chemical Industries Co., Ltd.) 23.0% by weight (Example 47, Comparative Examples 48 and 49)

Cellulose (reagent; Wako Pure Chemical Industries Co., Ltd.) 23.0% by weight (Example 48, Comparative Examples 50 and 51)

Potassium Chlorate (reagent; Kanto Chemical Co., Ltd.) 74.0% by weight (Examples 46 through 48) and 77.0% by weight (Comparative Examples 46 through 51)

MgO (reagent; Wako Pure Chemical Industries Co., Ltd.) 2.0% by weight (Example 46)

ZnO (reagent; Wako Pure Chemical Industries Co., Ltd.) 2.0% by weight (Example 47)

CaO (reagent; Wako Pure Chemical Industries Co., Ltd.) 2.0% by weight (Example 48)

The mixture was made by means of two steps mixing, wherein at first, carbohydrates and potassium chlorate were respectively mixed up with metal oxides, and then these mixtures were mixed together.

The resultant spontaneous firing explosive compositions were subjected to measurements on the pressure maximum time and the generated pressure by using a test vessel obtained by attaching a pressure sensor to a stainless vessel having an inner volume of 1 liter, in which the spontaneous firing explosive composition 15 gram was burned in the form of powder (1-liter tank test).

To ignite the spontaneous firing explosive composition, an ignitor having firing agents 0.6 gram contained of a boron/potassium nitrate and lead styphnate fuse heads were used. The pressure maximum time means a time interval from time when electrical current has finished flowing through the ignitor to time of raising the pressure till maximum.

The spontaneous firing explosive compositions were applied with temperature histories of 120° C.×100 hours and 107° C.×400 hours to determine the heat aging properties. A spontaneous firing temperature of the spontaneous firing explosive composition was measured by using a differential scanning calorimetry (Type DSC 220: Seiko Instruments Inc.). The results of the above test are summarized in Table 13.

TABLE 13

|  |  | components | | | | | | initial properties | | | properties after 100 hours 120° C. | | |
|---|---|---|---|---|---|---|---|---|---|---|---|---|---|
|  |  | carbohydrate | | potassium chlotate | metal oxide | | | | | | | | |
|  | No | type | average particle diameter (mm) | average particle diameter (mm) | type | average particle diameter (mm) | igniting time (msec) | maximum pressure (atm) | spontaneous firing temperature (°C.) | igniting time (msec) | maximum pressure (atm) | spontaneous firing temperature (°C.) |
| Example | 46 | cane sugar | 0.02 | 0.2 | MgO | ≦0.001 | 43 | 40.5 | 188 | 44 | 39.0 | 193 |
|  | 47 | dextrin | 0.01 | 0.1 | ZnO | 0.03 | 51 | 34.2 | 220 | 53 | 30.1 | 231 |
|  | 48 | powder cellulose | 0.03 | 0.1 | CaO | 0.01 | 57 | 29.9 | 248 | 62 | 27.3 | 255 |
| Comparative Example | 46 | cane sugar | 0.6 | 0.2 | absence | — | 42 | 41.7 | 183 | no-ignite | — | — |
|  | 47 | cane sugar | 0.02 | 0.2 | absence | — | 50 | 37.0 | 172 | no-ignite | — | — |
|  | 48 | dextrin | 0.7 | 0.1 | absence | — | 53 | 32.1 | 223 | no-ignite | — | — |
|  | 49 | dextrin | 0.01 | 0.1 | absence | — | 49 | 32.8 | 210 | no-ignite | — | — |
|  | 50 | powder cellulose | 0.03 | 0.1 | absence | — | 59 | 27.6 | 243 | no-ignite | — | — |
|  | 51 | powder cellulose | 0.03 | 0.1 | absence | — | 55 | 30.4 | 242 | no-ignite | — | — |

In Examples 46 through 48, there was no significant difference in properties between the initial properties and those after heat aging at 120° C. for 100 hours because the conditions met the specifications according to the present invention.

In Comparative Examples 46 through 51, non-igniting were found in all after the heat aging at 120° C. for 100 hours because there were no metal oxides contained. In addition, the spontaneous firing temperature couldn't be measured. For the state after heat aging, no changes were found in Examples while their color of test vessel change into black-brown due to effect of heat in all Comparative Examples.

As apparent from the above, the spontaneous firing explosive composition according to the present invention has a spontaneous firing function in a specific high-temperature range and kept a stable burning capability after the heat aging at 120° C. for 100 hours.

Next, described are examples where a four-component spontaneous firing explosive composition according to the present invention (carbohydrates/oxohalogenates/metal oxides/synthetic resins) is contained in the squib. This squib was assessed solely, too.

EXAMPLES 1 THROUGH 3, COMPARATIVE EXAMPLES 1 THROUGH 3

In FIG. 11, a pressure sensor 110 was attached to a SUS container 100 with a space 101 of a capacity of 10 milliliters. The squib 10 was attached to a lid of the SUS container 100. The electrode lead pins 7 of the squib 10 were connected to a squib ignition power source and an oscillograph for current measurement.

A terminal of the pressure sensor 110 was connected to the measurement oscillograph. A predetermined electrical current was flown across the squib to initiate it. An initiating time t (msec.) and maximum pressure value Pmax. (psi.) were measured. An initiating time t (msec.) means a time up to start raising the pressure after an electrical current has finished flowing through the squib.

A spontaneous firing explosive composition was prepared as follows. 1.2 parts of said super fine powder of light magnesium oxide (reagent; Wako Pure Chemical Industries Co., Ltd.) was added to and mixed with 74.8 parts of potassium chlorate (reagent; Wako Pure Chemical Industries Co., Ltd.) having an average particle diameter of 0.2 mm. After mixing, it was found that the surfaces resin, thereby to obtain the spontaneous firing explosive composition.

The squib was assembled in a following manner. A squib sheath 9 was placed in the squib cup 6, in which the spontaneous firing explosive composition 60 milli-gram was added. Subsequently, the initiating agents 4 (zirconium/potassium Perchlorate) 140 milli-gram was placed and a squib sealing plug 1 was engaged therewith. For comparison, an explosive made of sucrose/potassium chlorate/magnesium oxide with no synthetic resins. In addition, the squib was assembled in the same manner as those described above. Histories of the squib temperature were following three types: the room temperature only, 120° C.×100 hours and 107° C.×400 hours. The results are given in Table 14. there were significant struggling on comparative examples of both 120° C.×100 hours and 107° C.×400 hours. On the contrary, those according to the present invention provided stable results in the initiating time as well as the generated pressure.

EXAMPLES 4 THROUGH 6, COMPARATIVE EXAMPLES 4 THROUGH 6

In FIG. 12, the squib 10 was attached to a lid of a SUS container 120 having a space 101 of which a capacity is 10 milliliters. A hole for temperature measurement was formed in the lid, in which a thermocouple was inserted to monitor a temperature in the container. The container 120 was heated with a Bunsen burner. The container temperature at which they spontaneous firing explosive composition in the squib was spontaneously fired was recorded. The squib was as same as that used in the above mentioned examples. The results are given in Table 15. On comparative examples, the spontaneous firing explosive composition in the squib were spontaneously fired at 200° C. or higher, and of which struggling were significant. On the contrary, those according to the present invention were all spontaneously fired at and around 180° C. after the above mentioned heat aging test with less struggling.

EXAMPLES 7 THROUGH 9, COMPARATIVE EXAMPLES 7 THROUGH 9

In the gas generator 61 for air bag in FIG. 2 where the squib 10 was exposed to within the casing, the same squib as the one described in said examples was attached to a gas generator of an aluminum casing where the amount of agents in the gas generant pellets 51 and the igniting agent 41 were 55 gram and 1.7 gram, respectively. The gas generator was suspended in the air and subjected to a bonfire test with being heated by flame generated by firewood to be spontaneously fired. A heating time until spontaneous firing and a state of the gas generator after firing were observed. The results are given in Table 16. On comparative examples, the heat aging tests of 120° C.×100 hours and 107° C.×400 hours both resulted in filter breakage. On the contrary, those according to the present invention were not changed in appearance.

TABLE 14

Effect of synthetic resins on Squib temperature history (1)
-Squib initiating test-

|  | No | temperature history of Squib | presence or absence of synthetic resins | initiating time t (msec) | maximum pressure Pmax (psi.) |
|---|---|---|---|---|---|
| Examples | 1 | room temperature | presence | 1.11 | 1,650 |
|  | 2 | 120° C. 100 hours | presence | 1.12 | 1,610 |
|  | 3 | 107° C. 400 hours | presence | 1.12 | 1,620 |
| Comparative Examples | 1 | room temperature | absence | 1.10 | 1,670 |
|  | 2 | 120° C. 100 hours | absence | 1.05 | 1,480 |
|  | 3 | 107° C. 400 hours | absence | 1.08 | 1,520 |

TABLE 15

Effect of synthetic resins on Squib temperature history (2)
-Squib spontaneous firing test-

|  | No | temperature history of Squib | presence or absence of synthetic resins | container temperature upon firing (°C.) | heating time | comments |
|---|---|---|---|---|---|---|
| Examples | 4 | room temperature | presence | 178 | 2 min. 03 sec. |  |
|  | 5 | 120° C. 100 hours | presence | 180 | 2 min. 10 sec. |  |
|  | 6 | 107° C. 400 hours | presence | 181 | 2 min. 07 sec. |  |
| Comparative Examples | 4 | room temperature | absence | 205 | 2 min. 35 sec. |  |

TABLE 15-continued

Effect of synthetic resins on Squib temperature history (2)
-Squib spontaneous firing test-

| No | temperature history of Squib | presence or absence of synthetic resins | container temperature upon firing (°C.) | heating time | comments |
|---|---|---|---|---|---|
| 5 | 120° C. 100 hours | absence | 212 | 2 min. 46 sec. | |
| 6 | 107° C. 400 hours | absence | 214 | 2 min. 51 sec | |

TABLE 16

Effect of synthetic resins on Squib temperature history (3)
-Bonfire test-

| | No | temperature history of Squib | presence or absence of synthetic resins | heating time | Appearance of gas generator after firing |
|---|---|---|---|---|---|
| Examples | 7 | room temperature | presence | 2 min. 13 sec. | No-trouble |
| | 8 | 120° C. 100 hours | presence | 2 min. 15 sec. | No-trouble |
| | 9 | 107° C. 400 hours | presence | 2 min. 09 sec. | No-trouble |
| Comparative Examples | 7 | room temperature | absence | 2 min. 33 sec. | filter breakage |
| | 8 | 120° C. 100 hours | absence | 2 min. 49 sec. | filter breakage |
| | 9 | 107° C. 400 hours | absence | 2 min. 44 sec. | filter breakage |

Next, described are examples where a four-component spontaneous firing explosive composition according to the present invention (carbohydrates/oxohalogenates/metal oxides/a synthetic resins) is contained in a gas generant.

EXAMPLES 10 THROUGH 18, 19 THROUGH 21

A spontaneous firing explosive composition was prepared as follows. 1.2 parts of said super fine powder of light magnesium oxide (reagent; Wako Pure Chemical Industries Co., Ltd.) was added to and mixed with 74.8 parts of potassium chlorate (reagent; Wako Pure Chemical Industries Co., Ltd.) having an average particle diameter of 0.2 mm. After mixing, it was found that the surfaces of the potassium chlorate was coated with the magnesium oxide when observed through an optical microscope. Next, 1.0 parts of said light magnesium oxide (reagent; Wako Pure Chemical Industries Co., Ltd.) was added to and mixed with 23.0 parts of sucrose (Taito Corporation) having an average particle diameter of 0.05 mm. After mixing, it was found that the surface of the sucrose was coated with the magnesium oxide when observed through an optical microscope. The above mentioned total amount of potassium chlorate/magnesium oxide and sucrose/magnesium oxide were mixed with each other, to which 5.0 parts of silicon resin (Shin-etsu Silicon KR 44IT; Shin-etsu Chemical Co., Ltd.) was added. The mixture was kneaded over 30 minutes. Thereafter, the mixture was stood at a room temperature over 48 hours to cure the silicon resin, thereby to obtain the spontaneous firing explosive composition.

This spontaneous firing explosive composition was placed in a mill of which diameter is 10 mm and press-molded under a load of 500 kilo-gram to obtain pellets of the gas generant. Weight of one pellet is approximately 0.6 gram. As shown in FIG. 7, the above mentioned pellets 35 gram were placed in the gas generant container 50 and sealed as shown in FIG. 6. Twelve containers such as the above mentioned generant containers 50 were ready. We applied three types of temperature histories. Here are: room temperature, 120° C.×100 hours and 107° C.×400 hours. We used four containers to each types. Thereafter, as shown in FIG. 1, the gas generator 60 made of the aluminum casing was assembled. The gas generator 60 contains the squib 10 having zirconium/potassium Perchlorate 120 milli-gram, the igniting agent container 40 having the igniting agent (boron/potassium nitrate) 1.0 gram and the above mentioned gas generant container 50. This gas generator 60 was used for test of a pressure-time with a 60 liter tank and a heating test with firewood (bonfire test). The results are given in Table 17 and Table 19. Differences in temperature histories during the 60-liter tank pressure-time test were slight. During the bonfire test, there were no differences in temperature histories found. An igniting time t (msec.) means a time up to start raising the pressure after an electrical current has finished flowing through the squib. Maximum pressure time means a time for pressure to become maximum. A heating time t in Table 12 means a time for the gas generator 60 to fire.

COMPARATIVE EXAMPLES 10 THROUGH 18, 19 THROUGH 21

For comparison with the above mentioned examples, a gas generant was prepared without granulating with a silicon resin. As in the above, this was placed in a mill of which diameter is 10 mm and press-molded under a load of 500 kilo-gram to obtain pellets of the gas generant. Weight of one pellet is approximately 0.6 gram. As shown in FIG. 7, the above mentioned pellets 35 gram were placed in the gas generant container 50 and sealed as shown in FIG. 6. Twelve containers such as the above mentioned generant containers 50 were ready. We applied three types of temperature histories. Here are: room temperature, 120° C.×100 hours and 107° C.×400 hours. We used four containers to each types. Thereafter, as shown in FIG. 1, the gas generator 60 made of the aluminum casing was assembled. The gas generator 60 contains the squib 10 having zirconium/potassium Perchlorate 120 milli-gram, the igniting agents container 40 having the igniting agents(boron/potassium nitrate) 1.0 gram and the above mentioned gas generant container 50. This gas generator 60 was used for test of a pressure-time with a 60-liter tank and a beating test with firewood (bonfire test). The results are given in Table 18 and Table 19. During the 60-liter tank pressure-time test, there were a significant struggling in results. During the bonfire test, filter breakage was caused.

TABLE 17

Effect of synthetic resins on temperature history of gas generant pellet (1)
-60-liter tank test-

|  | No | temperature history of gas generant | presence or absence of synthetic resins | gas generator test temperature | igniting time t (msec) | maximum pressure KPa | maximum pressure time (msec) | abnormal appearance |
|---|---|---|---|---|---|---|---|---|
| Examples | 10 | room temperature | presence | room temperature | 6.2 | 206.3 | 49.4 | none |
|  | 11 |  |  | 85° C. | 5.8 | 232.9 | 45.0 | none |
|  | 12 |  |  | −40° C. | 6.4 | 175.5 | 53.1 | none |
|  | 13 | 120° C. 100 hours | presence | room temperature | 6.2 | 199.9 | 47.9 | none |
|  | 14 |  |  | 85° C. | 5.9 | 222.1 | 44.3 | none |
|  | 15 |  |  | −40° C. | 6.2 | 178.3 | 52.7 | none |
|  | 16 | 107° C. 400 hours | presence | room temperature | 5.8 | 202.6 | 51.0 | none |
|  | 17 |  |  | 85° C. | 5.5 | 229.8 | 46.1 | none |
|  | 18 |  |  | −40° C. | 5.9 | 180.3 | 53.3 | none |

TABLE 18

Effect of synthetic resins on temperature history of gas generant pellet (2)
-60-liter tank test-

|  | No | temperature history of gas generant | presence or absence of synthetic resins | gas generator test temperature | igniting time t (msec) | maximum pressure KPa | maximum pressure time (msec) | abnormal appearance |
|---|---|---|---|---|---|---|---|---|
| Comparative Examples | 10 | room temperature | absence | room temperature | 6.7 | 216.6 | 57.2 | none |
|  | 11 |  |  | 85° C. | 5.9 | 277.6 | 53.2 | none |
|  | 12 |  |  | −40° C. | 8.1 | 166.6 | 71.3 | none |
|  | 13 | 120° C. 100 hours | absence | room temperature | 7.3 | 201.5 | 60.7 | none |
|  | 14 |  |  | 85° C. | 6.4 | 249.8 | 51.2 | none |
|  | 15 |  |  | −40° C. | 8.8 | 173.3 | 71.5 | none |
|  | 16 | 107° C. 400 hours | absence | room temperature | 7.9 | 232.1 | 56.3 | none |
|  | 17 |  |  | 85° C. | 6.3 | 260.9 | 50.0 | none |
|  | 18 |  |  | −40° C. | 9.1 | 172.8 | 70.6 | none |

TABLE 19

Effect of synthetic resins on temperature history of gas generant pellet (3)
-Bonfire test-

|  | No | temperature history of gas generant | presence or absence of synthetic resins | heating time | Appearance of gas generator after firing |
|---|---|---|---|---|---|
| Examples | 19 | room temperature | presence | 1 min. 57 sec. | No-trouble |
|  | 20 | 120° C. 100 hours | presence | 2 min. 10 sec. | No-trouble |
|  | 21 | 107° C. 400 hours | presence | 2 min. 12 sec. | No-trouble |
| Comparative Examples | 19 | room temperature | absence | 2 min. 44 sec. | No-trouble |
|  | 20 | 120° C. 100 hours | absence | 2 min. 59 sec. | filter breakage |
|  | 21 | 107° C. 400 hours | absence | 2 min. 53 sec. | filter breakage |

EXAMPLES 22 THROUGH 30, 31 THROUGH 33

A spontaneous firing explosive composition was prepared as follows. 23.0 parts of wood powder having an average particle diameter of 0.05 mm was added to and mixed with 1.0 parts of said light magnesium oxide (reagent; Wako Pure Chemical Industries Co., Ltd.), to which 76.0 parts of potassium chlorate/magnesium oxide mixture prepared in said examples was added and mixed with each other, to which 5.0 parts of silicon resin was added. The mixture was kneaded over 30 minutes. Thereafter, the mixture was stood at a room temperature over 48 hours to cure the silicon resin. 24.0 parts of the above mentioned wood powder/potassium chlorate/magnesium oxide/silicon resin composition was mixed with 76.0 parts of spontaneous firing explosive composition based on sucrose/potassium chlorate/magnesium oxide/silicon resin prepared in said examples to obtain gas generant powder. As shown in FIG. 8, the above mentioned gas gerierarit 35 gram was placed in the gas generant container 50 and sealed as shown in FIG. 6. Twelve containers such as the above mentioned generant containers 50 were ready. We applied three types of temperature histories. Here are: room temperature, 120° C.×100 hours and 107° C.×400 hours. We used four containers to each types. Thereafter, as shown in FIG. 1, the gas generator 60 made of the aluminum casing was assembled. The gas generator 60 contains the squib 10 having zirconium/potassium Perchlorate 120 milli-gram, the igniting agents container 40 having the igniting agents(boron/potassium nitrate) 1.0 gram and the above mentioned gas generant container 50. This gas generator 60 was used for test of a pressure-time with a 60-liter tank and a heating test with firewood (bonfire test). The results are given in Table 20 and Table 22. Differences in temperature histories during the 60-liter tank pressure-time test were slight. During the bonfire test, there were no differences in temperature histories found.

COMPARATIVE EXAMPLES 22 THROUGH 30, 31 THROUGH 33

A wood powder/sucrose/potassium chlorate/magnesium oxide mixture was prepared as a gas generant in the same manner and same ratio of the above mentioned examples 22 to 30 without silicon resin. As shown in FIG. 8, the above mentioned gas generant 35 gram was placed in the gas generant container 50 and sealed as shown in FIG. 6. Twelve containers such as the above mentioned generant containers 50 were ready. We applied three types of temperature histories. Here are: room temperature, 120° C.×100 hours and 107° C.×400 hours. We used four containers to each types. Thereafter, as shown in FIG. 1, the gas generator 60 made of the aluminum casing was assembled. The gas generator 60 contains the squib 10 having zirconium/potassium Perchlorate 120 milli-gram, the igniting agents container 40 having the igniting agents(boron/potassium nitrate) 1.0 gram and the above mentioned gas generant container 50. This gas generator 60 was used for test of a pressure-time with a 60-liter tank and a heating test with firewood (bonfire test). The results are given in Table 21 and Table 22. During the 60-liter tank pressure-time test, there were a significant struggling in results. During the bonfire test, filter breakage was caused.

TABLE 20

Effect of synthetic resins on temperature history of gas generant powder (1)
-60-liter tank test-

|  | No | temperature history of gas generant | presence or absence of synthetic resins | gas generator test temperature | igniting time t (msec) | maximum pressure KPa | maximum pressure time (msec) | abnormal appearance |
|---|---|---|---|---|---|---|---|---|
| Examples | 22 | room temperature | presence | room temperature | 5.4 | 211.3 | 55.1 | none |
|  | 23 |  |  | 85° C. | 5.1 | 243.7 | 50.2 | none |
|  | 24 |  |  | −40° C. | 6.0 | 173.8 | 64.6 | none |
|  | 25 | 120° C. 100 hours | presence | room temperature | 5.2 | 209.8 | 57.5 | none |
|  | 26 |  |  | 85° C. | 4.9 | 251.6 | 50.3 | none |
|  | 27 |  |  | −40° C. | 6.2 | 177.3 | 66.0 | none |
|  | 28 | 107° C. 400 hours | presence | room temperature | 5.5 | 212.2 | 56.4 | none |
|  | 29 |  |  | 85° C. | 5.2 | 239.9 | 52.7 | none |
|  | 30 |  |  | −40° C. | 6.6 | 176.5 | 65.3 | none |

TABLE 21

Effect of synthetic resins on temperature history of gas generant powder (2)
-60-liter tank test-

|  | No | temperature history of gas generant | presence or absence of synthetic resins | gas generator test temperature | igniting time t (msec) | maximum pressure KPa | maximum pressure time (msec) | abnormal appearance |
|---|---|---|---|---|---|---|---|---|
| Comparative Examples | 22 | room temperature | absence | room temperature | 6.6 | 202.1 | 63.2 | none |
|  | 23 |  |  | 85° C. | 4.9 | 241.5 | 55.4 | none |
|  | 24 |  |  | −40° C. | 8.8 | 158.2 | 74.6 | none |
|  | 25 | 120° C. 100 hours | absence | room temperature | 7.9 | 190.2 | 65.7 | none |
|  | 26 |  |  | 85° C. | 4.8 | 227.4 | 55.6 | none |
|  | 27 |  |  | −40° C. | 10.3 | 154.6 | 89.2 | none |
|  | 28 | 107° C. 400 hours | absence | room temperature | 7.8 | 188.1 | 64.9 | none |
|  | 29 |  |  | 85° C. | 6.5 | 200.3 | 60.9 | none |
|  | 30 |  |  | −40° C. | 11.3 | 160.1 | 82.7 | none |

TABLE 22

Effect of synthetic resins on temperature history of
gas generant powder (3)
-Bonfire test-

|  | No | temperature history of gas generant | presence or absence of synthetic resins | heating time | Appearance of gas generator after firing |
|---|---|---|---|---|---|
| Examples | 31 | room temperature | presence | 1 min. 59 sec. | No-trouble |
|  | 32 | 120° C. 100 hours | presence | 2 min. 07 sec. | No-trouble |
|  | 33 | 107° C. 400 hours | presence | 2 min. 06 sec. | No-trouble |
| Comparative Examples | 19 | room temperature | absence | 2 min. 41 sec. | filter breakage |
|  | 20 | 120° C. 100 hours | absence | 2 min. 33 sec. | filter breakage |
|  | 21 | 107° C. 400 hours | absence | 2 min. 50 sec. | filter breakage |

Next, described are examples where a spontaneous firing explosive composition according to the present invention (carbohydrates/oxohalogenates/metal oxides/synthetic resins) was contained in the igniting agents.

EXAMPLES 34 THROUGH 42, 43 THROUGH 45

A spontaneous firing explosive composition was prepared as follows. 1.2 parts of said light magnesium oxide (reagent; Wako Pure Chemical Industries Co., Ltd.) was added to and mixed with 74.8 parts of potassium chlorate (reagent; Wako Pure Chemical Industries Co., Ltd.) having an average particle diameter of 0.2 mm. After mixing, it was found that the surfaces of the potassium chlorate were coated with the magnesium oxide when observed through an optical microscope. Next, 1.0 parts of said light magnesium oxide (reagent; Wako Pure Chemical Industries Co., Ltd.) were added to and mixed with 23.0 parts of sucrose (Taito Corporation) having an average particle diameter of 0.05 mm. After mixing, it was found that the surfaces of the sucrose were coated with the magnesium oxide when observed through an optical microscope. The above mentioned total amount of potassium chlorate/magnesium oxide and sucrose/magnesium oxide were mixed with each other, to which 5.0 parts of silicon resin (Shin-etsu Silicon KE 441T; Shin-etsu Chemical Co., Ltd.) were added. The mixture was kneaded over 30 minutes. Thereafter, the mixture was stood at a room temperature over 48 hours to cure the silicon resin, thereby to obtain the spontaneous firing explosive composition.

As shown in FIG. 9, the above mentioned spontaneous firing explosive composition 2.0 gram was placed in the igniting agents container 40 and sealed. Twelve containers such as the above mentioned igniting agents containers 40 were ready. We applied three types of temperature histories. Here are: room temperature, 120°×100 hours and 107° C.×400 hours. We used four containers to said each types. Thereafter, as shown in FIG. 1, the gas generator 60 made of the aluminum casing was assembled. The gas generator 60 contains the squib 10 having zirconium/potassium Perchlorate 120 milli-gram, the gas generant container 50 having the gas generant based on sodium azide 55 gram, and the igniting agents container 40 having the above mentioned spontaneous firing explosive composition. This gas generator 60 was used for test of a pressure-time with a 60-liter tank and a heating test with firewood (bonfire test). The results are given in Table 23 and Table 25. Differences in temperature histories during the 60 liter tank pressure-time test were slight. During the bonfire test, there were no differences in temperature histories found. An igniting time t (msec.) means a time up to start raising the pressure after an electrical current has finished flowing through the squib. Maximum pressure time means a time for pressure to become maximum. A heating time t means a time for the gas generator 60 to fire.

COMPARATIVE EXAMPLES 34 THROUGH 42, 43 THROUGH 45

For comparison with said examples, a sucrose/potassium chlorate/magnesium oxide was prepared as igniting agents without synthetic resins. This igniting agents were placed in the igniting agents container in the same manner of said examples. Twelve containers such as the above mentioned igniting agents containers 40 were ready. We applied three types of temperature histories. Here are: room temperature, 120° C.×100 hours and 107° C.×400 hours. We used four containers to said each types. Thereafter, as shown in FIG. 1, the gas generator was assembled with the same specifications of said examples except for the igniting agents. This gas generator is used to conduct the same assessment tests as in said examples. The results are given in Table 24 and Table 25. During the 60-liter tank pressure-time test, there was a significant struggling in results. During the bonfire test, filter breakage was caused.

TABLE 23

Effect of synthetic resins on igniting agents temperature history (1)
-60-liter tank test-

|  | No | temperature history of igniting agents | presence or absence of synthetic resins | gas generator test temperature | igniting time t (msec) | maximum pressure KPa | maximum pressure time (msec) | abnormal appearance |
|---|---|---|---|---|---|---|---|---|
| Examples | 34 | room temperature | presence | room temperature | 5.1 | 143.4 | 53.3 | none |
|  | 35 |  |  | 85° C. | 4.2 | 176.2 | 45.6 | none |
|  | 36 |  |  | −40° C. | 5.9 | 127.2 | 62.1 | none |
|  | 37 | 120° C. 100 hours | presence | room temperature | 5.3 | 147.8 | 54.1 | none |
|  | 38 |  |  | 85° C. | 4.5 | 170.9 | 46.6 | none |
|  | 39 |  |  | −40° C. | 6.3 | 120.5 | 65.2 | none |
|  | 40 | 107° C. 400 hours | presence | room temperature | 5.1 | 141.7 | 56.6 | none |
|  | 41 |  |  | 85° C. | 4.3 | 177.2 | 46.1 | none |
|  | 42 |  |  | −40° C. | 6.1 | 125.5 | 66.3 | none |

TABLE 24

Effect of synthetic resins on igniting agents temperature history (2)
-60-liter tank test-

| | No | temperature history of igniting agents | presence or absence of synthetic resins | gas generator test temperature | igniting time t (msec) | maximum pressure KPa | maximum pressure time (msec) | abnormal appearance |
|---|---|---|---|---|---|---|---|---|
| Comparative Examples | 34 | room temperature | absence | room temperature | 4.9 | 146.1 | 55.5 | none |
| | 35 | | | 85° C. | 4.1 | 177.3 | 41.4 | none |
| | 36 | | | −40° C. | 7.5 | 109.3 | 73.6 | none |
| | 37 | 120° C. 100 hours | absence | room temperature | 6.0 | 140.1 | 59.8 | none |
| | 38 | | | 85° C. | 4.8 | 168.3 | 42.3 | none |
| | 39 | | | −40° C. | 8.8 | 105.2 | 83.1 | none |
| | 40 | 107° C. 400 hours | absence | room temperature | 6.2 | 140.8 | 57.3 | none |
| | 41 | | | 85° C. | 5.0 | 165.5 | 43.9 | none |
| | 42 | | | −40° C. | 9.2 | 99.8 | 82.4 | none |

TABLE 25

Effect of synthetic resins on igniting agents temperature history (3)
-Bonfire test-

| | No | temperature history of igniting agents | presence or absence of synthetic resins | heating time | Appearance of gas generator after firing |
|---|---|---|---|---|---|
| Examples | 43 | room temperature | presence | 2 min. 01 sec. | No-trouble |
| | 44 | 120° C. 100 hours | presence | 2 min. 06 sec. | No-trouble |
| | 45 | 107° C. 400 hours | presence | 1 min. 59 sec. | No-trouble |
| Comparative Examples | 43 | room temperature | absence | 2 min. 24 sec. | filter breakage |
| | 44 | 120° C. 100 hours | absence | 2 min. 32 sec. | filter breakage |
| | 45 | 107° C. 400 hours | absence | 2 min. 40 sec. | filter breakage |

Next, described in conjunction with Table 26 are various exemplified combinations of carbohydrates, metal oxides and synthetic resins in a spontaneous firing explosive composition of carbohydrates/oxohalogenates/metal oxides/synthetic resins.

EXAMPLES 46 THROUGH 51, COMPARATIVE EXAMPLE 46 THROUGH 51

The combination given in Table 26 was mixed at the following ratio to prepare an explosive composition.

Sucrose (Taito Corporation) 23.0% by weight (Example 46 and 47, Comparative Examples 46 and 49)
Dextrin (reagent;Kishida Chemical Industries Co., Ltd.) 23.0% by weight (Examples 48 and 49, Comparative Examples 47 and 50)
Cellulose (reagent; Wako Pure Chemical Industries Co., Ltd.) 23.0% by weight (Examples 50 and 51, Comparative Examples 48 and 51)
Potassium Chlorate (reagent; Kanto Chemical Co., Ltd.) 74.0% by weight (Examples 46 through 51) and 77.0% by weight (Comparative Examples 46 through 51)
MgO (reagent; Wako Pure Chemical Industries Co., Ltd.) 2.0% by weight (Examples 46 through 48 and 50, Comparative Example 46)
ZnO (reagent; Wako Pure Chemical Industries Co., Ltd.) 2.0% by weight (Example 49, Comparative Example 47)
CaO (reagent; Wako Pure Chemical Industries Co., Ltd.) 2.0% by weight (Example 51, Comparative Example 48)
Silicon Resin (One-component room-temperature curable type) (Trade Name "Shin-etsu Silicon KE 44IT" available from Shinetsu Chemical Co., Ltd.) (Examples 46, 48 and 50, Comparative Examples 49 through 51)
Urethane Resin (Trade Name "Hi-Bon 4601" available from Hitachi Kasei Polymer Co., Ltd.) (Example 47)
Butyl Rubber (Trade Name "Hi-Bon IOIOA" available from Hitachi Kasei Polymer Co., Ltd.) (Example 49)
Polyester Resin (Trade Name "Hi-Bon 703IL" available from Hitachi Kasei Polymer Co., Ltd.) (Example 51).

The mixture was made by means of two steps mixing. At first, carbohydrates and potassium chlorate are respectively mixed up with metal oxides and then these mixtures are mixed together. Thereafter, the synthetic resins were added thereto, which was kneaded and granulated over 30 minutes and was stood at a room temperature over 48 hours for curing the resins.

The resultant spontaneous firing explosive compositions were subjected to measurements on the generated pressure and the time when said generated pressure rises up till maximum by using a test vessel obtained by attaching a pressure sensor to a stainless vessel having an inner volume of 1 liter, in which the spontaneous firing explosive composition 8 gram was burned in the form of granule (1-liter tank test).

To ignite the spontaneous firing explosive composition, a squib having firing agent 0.6 gram contained of a boron/potassium nitrate and lead styphnate fuse heads were used. The igniting time means a time interval from time when electrical current has finished flowing through the squib to time of starting raising the pressure.

The spontaneous firing explosive compositions were applied with temperature history of 120° C.×100 hours to determine the heat aging properties. A spontaneous firing temperature of the spontaneous firing explosive compositions was measured by using a differential thermal analyzer (Type OSC 220: Seiko Instruments Inc.). The results of the above tests are summarized in Table 26.

TABLE 26

| | No | carbohydrates type | carbohydrates average particle diameter (mm) | potassium chlotate average particle diameter (mm) | metal oxides type | metal oxides average particle diameter (mm) | synthetic resin type |
|---|---|---|---|---|---|---|---|
| Examples | 46 | sucrose | 0.02 | 0.2 | MgO | ≦0.001 | Silicon |
| | 47 | sucrose | 0.02 | 0.2 | MgO | ≦0.001 | Urethane |
| | 48 | dextrin | 0.01 | 0.1 | MgO | ≦0.001 | Silicon |
| | 49 | dextrin | 0.01 | 0.1 | ZnO | 0.03 | Butyl Rubber |
| | 50 | powder cellulose | 0.03 | 0.1 | MgO | ≦0.001 | Silicon |
| | 51 | powder cellulose | 0.03 | 0.1 | CaO | 0.01 | Polyester |
| Comparative Examples | 46 | sucrose | 0.02 | 0.2 | MgO | ≦0.001 | absence |
| | 47 | dextrin | 0.01 | 0.1 | ZnO | 0.03 | absence |
| | 48 | powder cellulose | 0.03 | 0.1 | CaO | 0.01 | absence |
| | 49 | sucrose | 0.02 | 0.2 | absence | — | Silicon |
| | 50 | dextrin | 0.01 | 0.1 | absence | — | Silicon |
| | 51 | powder cellulose | 0.03 | 0.1 | absence | — | Silicon |

| | | initial properties | | | properties after 100 hours 120° C. | | |
|---|---|---|---|---|---|---|---|
| | No | maximum pressure time (msec) | maximum pressure (atm) | spontaneous firing temperature (°C.) | maximum pressure time (msec) | maximum pressure (atm) | spontaneous firing temperature (°C.) |
| Examples | 46 | 38 | 42.6 | 173 | 37 | 43.0 | 175 |
| | 47 | 40 | 39.5 | 174 | 41 | 39.7 | 174 |
| | 48 | 45 | 36.0 | 203 | 44 | 37.0 | 206 |
| | 49 | 43 | 35.3 | 199 | 42 | 36.4 | 200 |
| | 50 | 49 | 27.3 | 222 | 48 | 26.2 | 224 |
| | 51 | 51 | 31.1 | 225 | 47 | 27.0 | 226 |
| Comparative Examples | 46 | 43 | 40.5 | 188 | 44 | 39.0 | 193 |
| | 47 | 51 | 34.2 | 220 | 53 | 30.1 | 231 |
| | 48 | 57 | 29.9 | 248 | 62 | 27.3 | 255 |
| | 49 | 25 | 43.7 | 169 | no-ignite | — | — |
| | 50 | 33 | 34.6 | 195 | no-ignite | — | — |
| | 51 | 46 | 28.0 | 219 | no-ignite | — | — |

In Examples 46 through 51, there were no significant differences in properties between the initial properties and those after heat aging at 120° C. for 100 hours because the conditions met the specifications according to the present invention. In particular, reproducibility of the spontaneous firing temperature was excellent.

In Comparative Examples 46 through 48, the spontaneous firing temperatures were increased because there were no synthetic resins contained. The spontaneous firing temperatures were further increased after the heat aging at 120° C. for 100 hours. In Comparative Examples 49 through 51, non-igniting were found after the heat aging at 120° C. for 100 hours because there were no metal oxides contained. In addition, the spontaneous firing temperature couldn't be measured. For the state after heat aging, no changes were found in Examples and Comparative Examples 46 through 48 while Comparative Examples 49 through 51 resulted in color change into black-brown due to effect of heat.

As apparent from the above, the spontaneous firing explosive composition according to the present invention has a spontaneous firing function in a specific high-temperature range and kept a stable burning capability after the heat aging at 120° C. for 100 hours.

As described in detail above, the gas generator for air bag according to the present invention requires no preparation of a specific container space in a casing by means of containing a spontaneous firing explosive composition comprising carbohydrates, oxohalogenates and metal oxides in at least one of the squib, the igniting agents and the gas generant, and it is thus possible to maintain stable properties for a long time with safety and a spontaneous firing function at a low temperature up to 220° without particular considerations on the heat conductivity between the casing, so that it is optimum as the gas generator with the casing of a light alloy material or the like of which mechanical strength will be deteriorated when being subjected to high temperature environments. When the heat conductivity from outside is not so good, it is possible to further ensure the spontaneous firing function at a low temperature up to 200° C. by means of containing a spontaneous firing explosive composition consisting of carbohydrates, oxohalogenates, metal oxides and synthetic resins.

In particular, when the squib contains the spontaneous firing explosive composition according to the present invention as compared with a case where it is contained in the gas generant or the firing agents, this eliminates a fear of the explosive left in the casing without igniting of the squib after the spontaneous firing of said explosive composition. In addition, in case of prior art such as a spontaneous firing explosive composition also serving as initiating agents, the bridge wire contacting therewith is corroded due to acidic substances generated as a result of deterioration with time. So, there's a fear for an incorrect operation because of the squib not initiated upon a normal operation. While in case of the present invention, there's no fear such as said trouble. Further, the present invention can find various applications as the squib having the spontaneous firing function.

In particular, when the gas generant contains the spontaneous firing explosive composition according to the present invention, no toxic gas is generated after it absorbs water as compared with conventional ones based on sodium azide. It can be a gas generator containing a novel gas generant which is capable of maintaining stable properties during exposure to high temperature environments for a long time and which has an adequate burning rate in a normal operation.

Further, when the igniting agents contains the spontaneous firing explosive composition according to the present invention, this is possible to obtain a more excellent high-temperature stability and a more sufficient burning rate than ones of the prior art such as a spontaneous firing explosive composition also serving as igniting agents.

Figure 13:
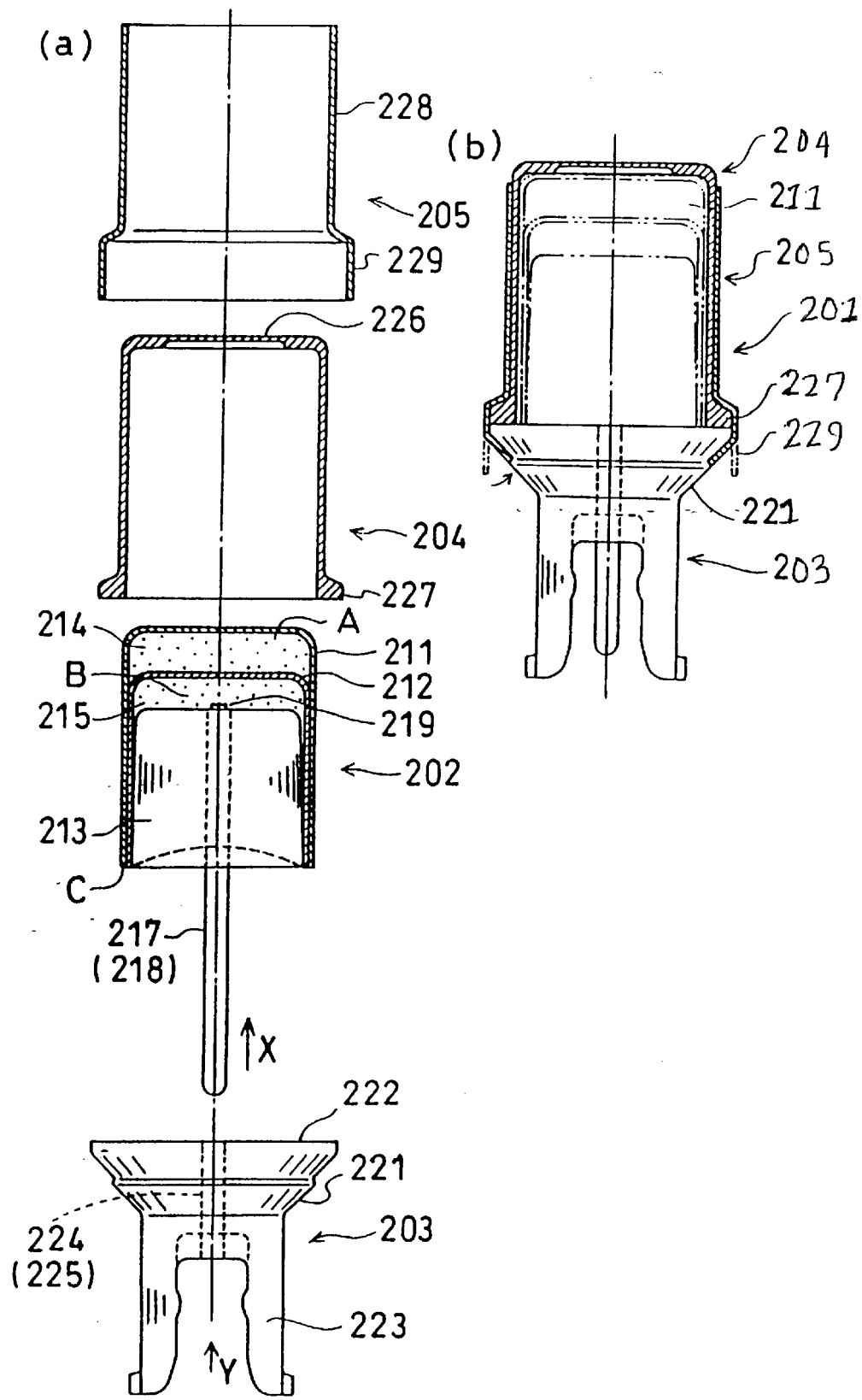
FIGS. 13, 14 and 15 illustrate an assembly process of a pin type squib of the invention.
Figure 14:
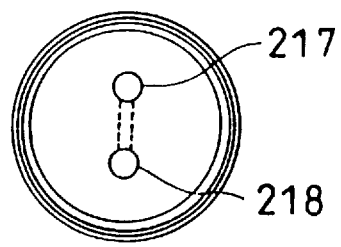
Figure 15:
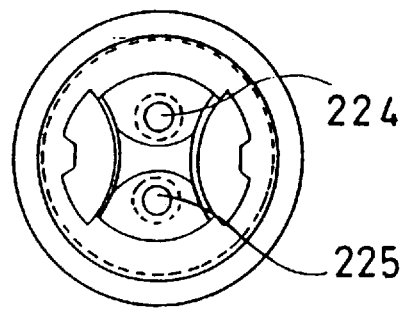

The embodiment of this invention concerning a squib will be described below referring to the drawings. FIG. 13 is an assembly process drawing illustrating of a pin type squib of this invention, FIG. 14 is a drawing viewing FIG. 13 from X, and FIG. 15 is a drawing viewing FIG. 13 from Y.

Firstly construction of each part will be described using FIG. 13. A pin type squib 201 illustrated as assembled condition in FIG. 13(b) consists of a squib plug assembly 202, a holder 203, a cover 204, and a retaining member 205 as shown in FIG. 13(a).

The squib plug assembly 202 has two separated chambers A and B formed by airtightly inserting a second cup 212 into a first cup 211 and airtightly blocking the second cup 212 with a plug 213. The first and second caps have cylindrical shapes with bottoms respectively. The first chamber A formed at the bottom of the first cup 211 contains the spontaneous firing explosive composition 214 having function for automatic ignition, and the second chamber B formed at the bottom of the second cup 212 contains initiating agents 215. In addition the first cup 211 and the second cup 212 are formed by pressing a metallic material such as aluminum sheet and the like.

The spontaneous firing explosive composition 214 having function of automatic ignition is for example such a mixture of carbohydrate, oxohalogenates and metal oxides as proposed by Japanese Patent Application No. H 7-232613. The initiating agents 215 are for example zirconium/potassium perchlorate composition, zirconium/tungsten/potassium perchlorate composition, diazodinitrophenol and the like. The spontaneous firing explosive composition 214 having automatic ignition function can be contained in the squib without thermal influence by separately arranging the spontaneous firing explosive composition 214 having automatic ignition function and the initiating agents 215 having firing function. In more detail the first cup containing the spontaneous firing explosive composition 214 and the second cup containing the initiating agents 215 and blocked by the plug 213 are firstly manufactured. Then the second cup 212 with the plug 213 is inserted into the first cup 211, and they are assembled so that every end of the first cup 211, the second cup 212 and the plug 213 may meet at the same point C. The plug 213 is made of insulating material such as glass. Further the part C, where the first cup 211, the second cup 212 and the plug 213 are gathering, is melted by laser beam welding to realize fixing and sealing simultaneously.

The plug 213 made of insulating material such as glass is penetrated by a pair of pins 217 and 218 (see FIG. 14) and is formed so as to block the second cup by being inserted into it. The pins 217 and 218 are penetrating the plug 213 and bridged on the top surface of the plug 213 by a heating element 219 such as nickel-chromium wire. This heating element is electrically heated so as to ignite the initiating agents 215 contacting with the heating element 219. Further the clearances between the pins 217, 218 and the plug 213 are sealed by resin or the like.

The holder 203 is made of insulating material such as nylon, has a contact face 222 at the top end of a conical seat 221, and has a connector holding part 223 extending downward from the conical seat 221. The conical seat is a surface to be touched with the squib plug assembly 202. Two holes 224 and 225 are machined from the contact face 222 to the connector holding part 223 (see FIG. 15), and the pair of pins 217 and 218 of the squib plug assembly 202 are inserted into these holes 224 and 225, so that the squib plug assembly 202 is held by the holder 203.

The cover 204 is made of an insulating material such as nylon and has a cylindrical shape with a bottom so as to cover the squib plug assembly 202. A rupture face 226 having thin thickness is formed at the bottom of the cover 204, and a flange 227 (protruding part) is provided at the inlet side of the cover 204.

The retaining member 205 is made of a metallic material such as an aluminum sheet and consists of a cylindrical portion 228 fitting on the outer surface of the cover 204 and a caulking portion extending downward from said cylindrical portion. The caulking portion 229 is a cylinder having a larger inner diameter than outer diameters of the conical seat 221 of the holder and the flange 227 of the cover 204, and can be bent by a caulking tool. It is preferable that this cylindrical portion 228 is extended so as to surround a portion where there is the spontaneous firing explosive composition 214.

Because the cylindrical portion 228 ensures automatic ignition function of the spontaneous firing explosive composition 214 to catch the atmospheric temperature and transmit the temperature to the spontaneous firing explosive composition 214.

Now the assembling process of the pin type squib consisting of the above-mentioned constructing parts will be described. The above-mentioned four parts 202, 203, 204 and 205 are prepared as shown in FIG. 13(a). The pins 217 and 218 of the squib plug assembly 202 are inserted into and pushed in the holes 224 and 225 of the holder 203 till the ends C of the cups 211 and 212 touch to the contacting surface 222. In this time, a protruding part having trapezoidal cross-section is formed by the top end of the conical seat 221 of the holder 203 and the flange 227 of the cover 204 contacting with each other. Then the cover 204 is pushed in the holder 203 till the end of the flange 227 touches with the contacting face 222 of the holder 203 so that the squib plug assembly 202 may be covered by the cover 204. Further the cover 204 is inserted into the retaining member 205 and is pushed in till the flange 227 of the cover 204 is covered with the caulking portion 229 of the retaining member 205. This assembling condition is shown in the upper part of FIG. 13(b). And when bending such a part of the caulking portion 229 of the retaining member 204 inward as shown by chain double-dashed lines in FIG. 1(b), the protruding part having trapezoidal cross-section is covered with the caulking portion 229 of the retaining member 205. Thus four parts 202, 203, 204 and 205 are integrated to one body.

Figure 16:
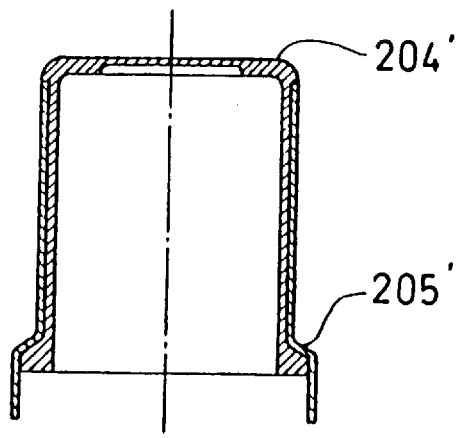
FIG. 16 is an illustration of an integral cover and retaining member to cover the squib plug assembly.

In the above-mentioned embodiment the cover 204 and the retaining member 205 were described assuming that they are separately constructed, however a cover 204' and a retaining member 205' can be formed as an integral body to cover the squib plug assembly 202 as shown in FIG. 16.

Aforementioned pin type squib 201 is allowed to be incorporated into a gas generator either from the interior or exterior of a gas generator housing.

Figure 17:
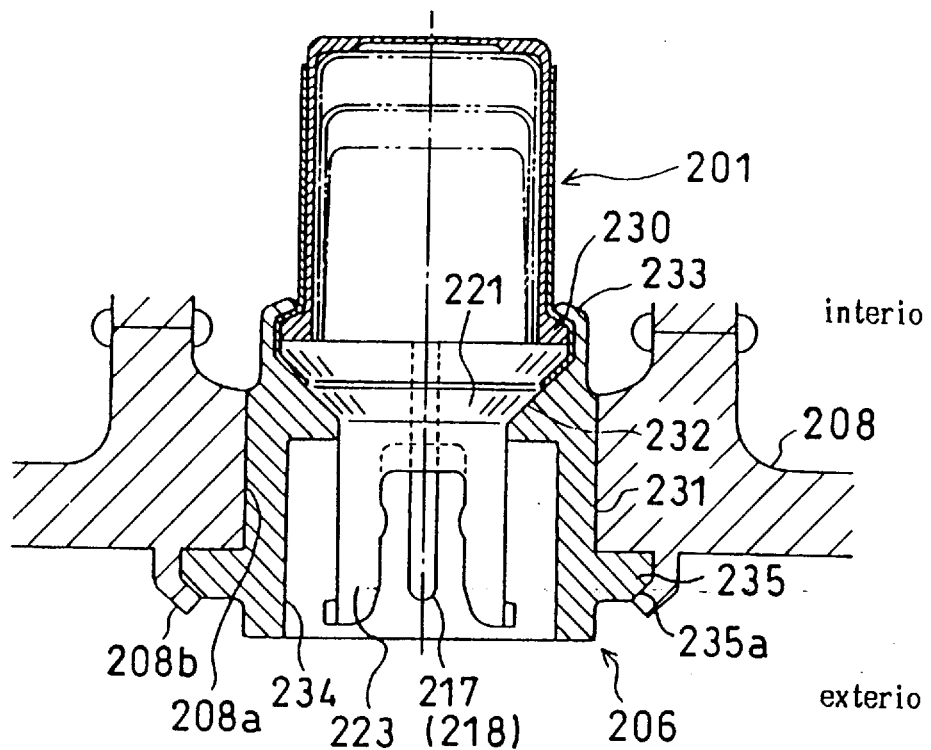
FIG. 17 is an illustration of a squib holder for a pin type squib.

FIG. 17 shows the case of using a squib holder 206 in order to enable the pin type squib 201 to be incorporated from the exterior of the gas generator housing 208. This squib holder has a cylindrical member 231 which is a part to be fitted to the housing 208, a seat 232 provided at an upper portion in the cylindrical member 231 for receiving the conical seat 221, and other caulking portion 233 extending upward from the seat 232 for holding the circular protruding part 230 of the squib 201. And at a lower portion of the cylindrical member 231, a flange 235 externally protruding from the cylindrical member 231 is formed. The flange 235 has a chamfering portion 235a. This squib holder 206 is made of a metallic material such as an aluminum.

The squib 201 and the squib holder 206 can be integrated by inserting the squib 201 into the squib holder 206 and bending the caulking portion 233 inwardly using a caulking tool as shown in FIG. 17. The pin type squib 201 with the squib holder 206 can be fixed to the gas generator by inserting the squib holder 206 into a hole 208a of the gas generator housing 208 from outside and bending a caulking portion 208b of the gas generator housing 208 inwardly using a caulking tool so as to wrap the chamfer 235a of the flange 235 of the cylindrical member 231. In this condition the connector holding part 223 protrudes downward into a cavity 234 provided at the lower side in the squib holder 206, and the pair of pins 217 and 218 protrude downward in the connector holding part 223. Therefore when a connector (not shown) is inserted into the cavity 234, an electrical connection to the pins 217 and 218 can be easily carried out.

Figure 18:
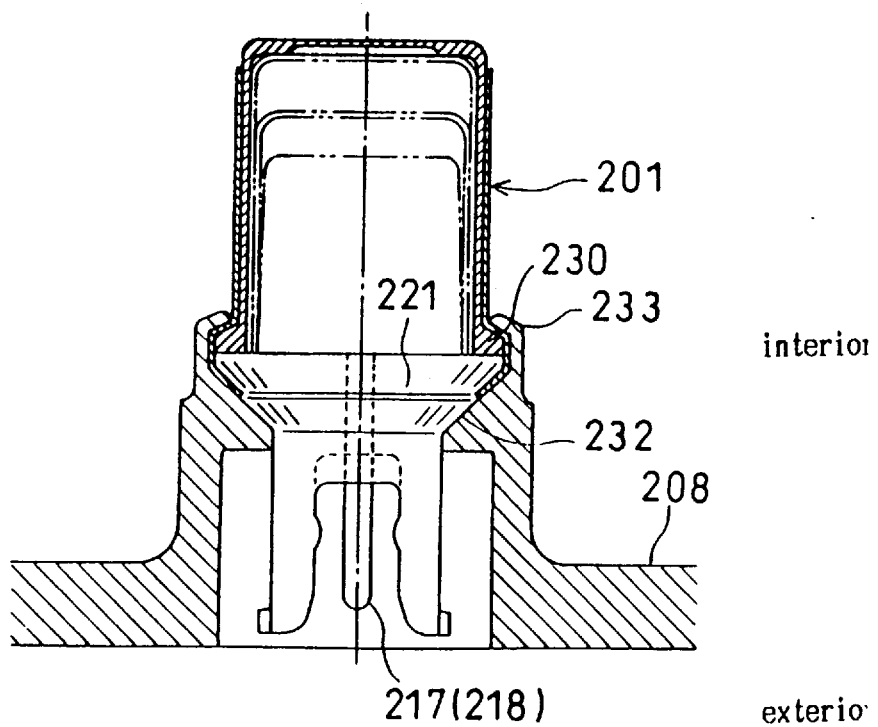
FIG. 18 illustrates the incorporation of a pin type squib in a gas generator housing interior.

In addition, the condition that the pin type squib 201 is incorporated into a gas generator from the interior of the gas generator housing will be described referring to FIG. 18. The seat 232 for receiving the conical seat 221 and the caulking portion 233 for holding the circular protruding part 230 of the squib 201 are provided in the gas generator housing 208. The caulking portion 233 extends upward from the seat 232. The squib 201 can be fixed to the gas generator housing 208 from the interior by inserting the squib 201 from the interior of the gas generator housing 208 till the conical seat 221 contacts with the seat 232 and bending the caulking portion inwardly using the caulking tool as shown in the drawing.

Figure 19:
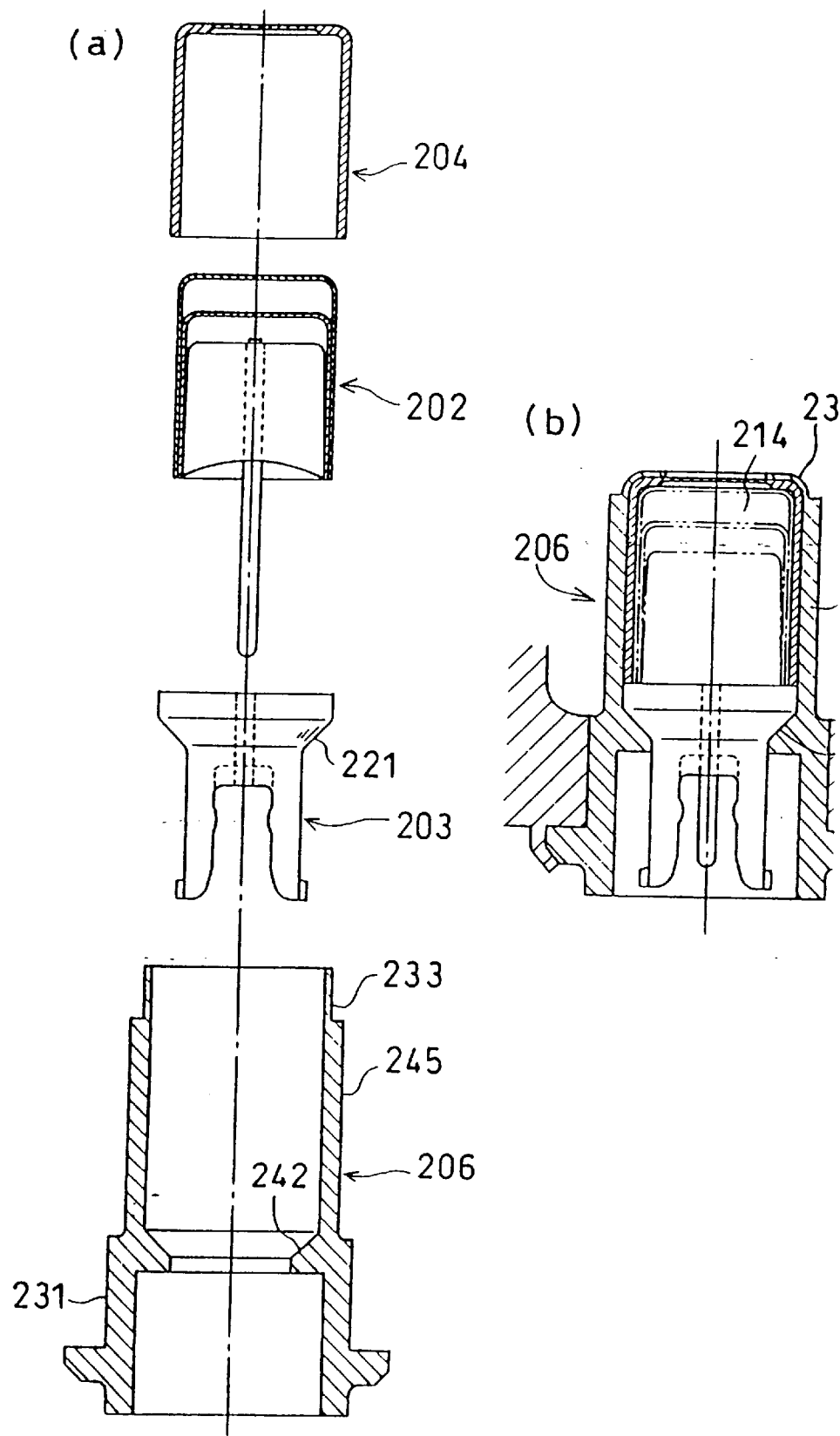
FIG. 19 illustrates an alternative mounting of a pin type squib where the retaining member is combined with the squib holder as one unit.

FIG. 19 shows the other embodiment of the pin type squib and its mounting construction. The difference with the squib shown in FIG. 13 is that the retaining member 205 is combined with the squib holder 206 so as to be one squib holder having both retaining and holding functions. Due to this modification, the number of the assembling parts and the number of working process for assembling can be reduced. The squib holder 206 shown in FIG. 19(a) consists of the cylindrical member 231 as a part to be fitted with the gas generator, the seat 242 for receiving the holder 203 provided in the cylindrical member 231, a cylindrical portion 245 extending upward from the seat 242 so as to cover the side of the cover 204, and the caulking portion 233 located at the upper end of this cylindrical part 245 in order to press the bottom of the cover 204.

As shown in FIG. 19(a), the squib plug assembly 202 is inserted into the holder 203, the squib plug assembly 202 is covered with the cover 204. These parts are pressed into the cylindrical part 245 of the squib holder 206. And the conical seat 221 of the holder 203 is pressed onto the seat 232. And by bending the caulking portion inwardly using the caulking tool (not shown), the holder 203, the squib plug assembly 202 and the cover 204 are held between the seat 232 and the caulking portion 233 and fixed as shown in FIG. 19(b). In case that the cylindrical part 245 has thick wall, the cylindrical part 245 is heated and stores the heat when the temperature rises in the gas generator. And then the cylindrical part 245 transmits the heat to the interior of the cylindrical part 245 well. Therefore, the cylindrical part 245 has thick wall so as to minimize the delay of temperature rising in the spontaneous firing explosive composition 214.

As aforementioned, the squib cover 204 and the holder 203 are made of insulating material according to the present invention. Accordingly, an insulation performance of a pin type squib is improved in addition to the spontaneous firing function.

Further, a squib can be easily mounted on a housing.

Having described the present invention, it will now be apparent that many changes and modifications may be made to the embodiments described above without departing from the spirit and the scope of the present invention.

What is claimed as new and desired to be secured by Letters Patent of the United States is:

1. A squib, comprising
   a first cup and a second cup, said first and second cups made of a metallic material, where the second cup is inserted into the first cup so as to tightly fit with each other;
   a spontaneous firing explosive composition contained in a bottom of said first cup, said spontaneous firing explosive composition comprising of carbohydrates, oxohalogenates and metal oxides;
   initiating agents contained in a bottom of said second cup;
   a squib plug blocking an opening of said second cup;
   a pair of electrode lead pins penetrating through said squib plug; and
   a heater bridging between said pair of electrode lead pins for igniting said initiating agents contained in said second cup.

2. A squib, comprising
   a first cup and a second cup, said first and second cups made of a metallic material, where the second cup is inserted into the first cup so as to tightly fit with each other;
   a spontaneous firing explosive composition contained in a bottom of said first cup, said spontaneous firing explosive composition comprising of carbohydrates, oxohalogenates metal oxides and synthetic resin;
   initiating agents contained in a bottom of said second cup;
   a squib plug blocking an opening of said second cup;
   a pair of electrode lead pins penetrating through said squib plug; and
   a heater bridging between said pair of electrode lead pins for igniting said initiating agents contained in said second cup.

3. A squib, comprising
   a squib plug assembly including a first cup and a second cup, said first and second cups made of a metallic material, said second cup inserted into the first cup so as to tightly fit with each other; a spontaneous firing explosive composition contained in a bottom of said first cup, said spontaneous firing explosive composition comprising of carbohydrates, oxohalogenates and metal oxides; initiating agents contained in a bottom of said second cup; a squib plug blocking an opening of said second cup; a pair of electrode lead pins penetrating through said squib plug; and a heater bridging between said pair of electrode lead pins for igniting said initiating agents contained in said second cup;

a cover made of insulating material for covering said squib plug assembly; and a holder made of insulating material for holding said squib plug assembly with inserting said pair of lead pins into said holder.

4. A squib, comprising a squib plug assembly including a first cup and a second cup, said first and second cups made of a metallic material, said second cup inserted into the first cup so as to tightly fit with each other; a spontaneous firing explosive composition contained in a bottom of said first cup, said spontaneous firing explosive composition comprising of carbohydrates, oxohalogenates, metal oxides and synthetic resin; initiating agents contained in a bottom of said second cup; a squib plug blocking an opening of said second cup; a pair of electrode lead pins penetrating through said squib plug; and a heater bridging between said pair of electrode lead pins for igniting said initiating agents contained in said second cup;

a cover made of insulating material for covering said squib plug assembly; and a holder made of insulating material for holding said squib plug assembly with inserting said pair of lead pins into said holder.

5. The squib as claimed in claim 3, further comprising a retaining member made of a metallic material for fixing said cover to said holder being in contact with end of said cover.

6. The squib as claimed in claim 4, further comprising a retaining member made of a metallic material for fixing said cover to said holder being in contact with end of said cover.

7. The squib as claimed in claim 5, wherein said retaining member has a cylindrical portion covering sides of said squib plug assembly and a caulking portion caulked so as to wrap a protruding part which is formed with one end of said holder and one end of said cover.

8. The squib as claimed in claim 6, wherein said retaining member has a cylindrical portion covering sides of said squib plug assembly and a caulking portion caulked so as to wrap a protruding part which is formed with one end of said holder and one end of said cover.

9. The squib as claimed in claim 5, wherein said cover and said retaining member are formed as an integral body.

10. The squib as claimed in claim 6, wherein said cover and said retaining member are formed as an integral body.

11. The squib as claimed in claim 1, wherein a rupture face having thin thickness is formed at a bottom of said cover.

12. The squib as claimed in claim 4, wherein a rupture face having thin thickness is formed at a bottom of said cover.

13. The squib as claimed in claim 1, wherein said spontaneous firing explosive composition has spontaneous firing temperature in the range between 165° C. and 220° C.

14. The squib as claimed in claim 1, wherein said spontaneous firing explosive composition has thermal stability and comprises one of carbohydrates being selected from the group consisting of sucrose, lactose, glucose, powder cellulose, dextrin and wood powder, one of oxohalogenates being selected from the group consisting of chlorates, perchlorates, bromates, perbromates, iodates and periodates and one of metal oxides being selected from the group consisting of calcium oxide, magnesium oxide and zinc oxide.

15. The squib as claimed in claim 2, wherein said spontaneous firing explosive composition has thermal stability and comprises one of carbohydrates being selected from the group consisting of sucrose, lactose, glucose, powder cellulose, dextrin and wood powder, one of oxohalogenates being selected from the group consisting of chlorates, perchlorates, bromates, perbromates, iodates and periodates, one of metal oxides being selected from the group consisting of calcium oxide, magnesium oxide and zinc oxide and one of synthetic resins being selected from the group consisting of silicon resins, urethane resins, polyesters, acrylic resins and butyl rubbers.

16. The squib as claimed in claim 14, wherein one of said carbohydrates or oxohalogenates is coated with said metal oxides.

17. The squib as claimed in claim 15, wherein one of said carbohydrates or oxohalogenates is coated with said metal oxides.

* * * * *